US012110009B2

(12) United States Patent
Wang et al.

(10) Patent No.: US 12,110,009 B2
(45) Date of Patent: Oct. 8, 2024

(54) PARKING SPACE DETECTION METHOD AND SYSTEM

(71) Applicant: Valeo Schalter und Sensoren GmbH, Bietigheim-Bissingen (DE)

(72) Inventors: Lihao Wang, Troy, MI (US); Antonyo Musabini, Troy, MI (US); Christel Leonet, Troy, MI (US); Rachid Benmokhtar, Troy, MI (US)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 75 days.

(21) Appl. No.: 18/151,069

(22) Filed: Jan. 6, 2023

(65) Prior Publication Data
US 2024/0227785 A1    Jul. 11, 2024

(51) Int. Cl.
*B60W 30/06*    (2006.01)
*B60R 1/22*    (2022.01)
(Continued)

(52) U.S. Cl.
CPC .............. *B60W 30/06* (2013.01); *B60R 1/22* (2022.01); *G06V 10/82* (2022.01); *G06V 20/586* (2022.01);
(Continued)

(58) Field of Classification Search
CPC ... B60W 30/06; B60W 2420/403; B60R 1/22; B60R 2300/607; B60R 2300/806; G06V 10/82; G06V 20/586
See application file for complete search history.

(56) References Cited

U.S. PATENT DOCUMENTS 10,242,576 B2 *  3/2019  Kume ................... B62D 15/027
10,467,789 B2 * 11/2019  Watanabe ................ B60T 7/12
(Continued)

FOREIGN PATENT DOCUMENTS

CN    110348297 A    10/2019
CN    110796063 A     2/2020
WO    2021-184616 A1   9/2021

OTHER PUBLICATIONS

International Search Report and Written Opinion issued in counterpart International Application No. PCT/ US2023/083998, mailed Apr. 18, 2024 (17 pages).

*Primary Examiner* — John A Tweel, Jr.
(74) *Attorney, Agent, or Firm* — Osha Bergman Watanabe & Burton LLP

(57) ABSTRACT

A method that includes obtaining a first image from a first camera disposed on a vehicle and generating a birds-eye view (BEV) image using the first image. The method further includes processing, with a machine-learned model, the BEV image to produce parking slot prediction data. The parking slot prediction data includes a first center coordinate for a first available parking slot, a first parking slot confidence, and a first corner displacement data. The first corner displacement data includes a first relative coordinate pair that locates a first corner relative to the first center coordinate and a second relative coordinate pair that locates a second corner relative to the first center coordinate. The method further includes determining a first location of the first available parking slot using the parking slot prediction data and parking the vehicle in the first available parking slot when the first parking slot confidence meets a threshold.

14 Claims, 16 Drawing Sheets

(51) Int. Cl.
*G06V 10/82* (2022.01)
*G06V 20/58* (2022.01)

(52) U.S. Cl.
CPC ... *B60R 2300/607* (2013.01); *B60R 2300/806* (2013.01); *B60W 2420/403* (2013.01)

(56) References Cited

U.S. PATENT DOCUMENTS

| | | | |
|---|---|---|---|
| 10,587,801 B2* | 3/2020 | Satomi | H04N 7/181 |
| 11,151,881 B2* | 10/2021 | Yamamura | B60W 30/06 |
| 2014/0293001 A1* | 10/2014 | Yu | B62D 15/028 |
| | | | 348/36 |
| 2020/0089974 A1 | 3/2020 | Ding et al. | |
| 2020/0156534 A1* | 5/2020 | Oikawa | B60Q 1/549 |
| 2022/0013012 A1* | 1/2022 | Higuchi | G08G 1/143 |
| 2022/0245952 A1 | 8/2022 | Zhang et al. | |
| 2023/0102253 A1 | 3/2023 | Lv et al. | |

\* cited by examiner

PARKING SPACE DETECTION METHOD AND SYSTEM

BACKGROUND

Parking a vehicle is known to be a stressful task for drivers. As such, various automotive companies have endeavored to automate the task of parking a vehicle through on-board driver assistance systems. To accurately park a vehicle, an available parking slot must be identified. Generally, parking slot detection is performed with one or more sensory systems disposed on the vehicle coupled with a computational method to process sensory data received from the sensory system(s). A sensory system may include a transmitter (e.g., laser light) and one or more sensors. A non-exhaustive list of example sensory systems may include: camera; LiDAR; radar; and ultrasonic sensors. However, despite available sensory data, there are many challenges surrounding accurately and efficiently detecting available parking slots.

Computational methods for processing the vehicle sensory data and identifying an available parking slot are often slow and prohibitive for real-time use. Further, many parking slot detection systems can only detect parking slots under limiting conditions, such as parking slots of certain orientations, parking slots with clearly drawn boundaries, and parking slots bounded by other parking slots occupied with vehicles. The inability of parking slot detection systems to quickly and consistently identify available parking slots over diverse situations leads to a general mistrust of driver assistance systems.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Embodiments disclosed herein generally relate to a method that includes obtaining a first image from a first camera disposed on a vehicle and generating a birds-eye view (BEV) image using the first image. The method further includes processing, with a machine-learned model, the BEV image to produce parking slot prediction data. The parking slot prediction data includes a first center coordinate for a first available parking slot, a first parking slot confidence, and a first corner displacement data. The first corner displacement data includes a first relative coordinate pair that locates a first corner relative to the first center coordinate and a second relative coordinate pair that locates a second corner relative to the first center coordinate. The method further includes determining a first location of the first available parking slot using the parking slot prediction data and parking the vehicle in the first available parking slot when the first parking slot confidence meets a threshold.

Embodiments disclosed herein generally relate to a computer-implemented method of training a machine-learned model. The method includes obtaining a plurality of birds-eye view (BEV) images and identifying available parking slots in the plurality of BEV images. Further, for each identified available parking slot in a BEV image, the method further includes: determining a ground truth parking representation of the identified available parking slot, where the ground truth parking representation includes a center coordinate and corner displacements; computing an enveloping width and an enveloping height using the center coordinate and the corner displacements; and matching the identified available parking slot with one or more anchor boxes using the enveloping height and the enveloping width. Once a ground truth parking representation has been determined for each identified available parking slot in a given BEV image, the method further includes generating a target data structure for the given BEV image that includes the center coordinate and the corner displacements for each of the identified available parking slots in the given BEV image. The method further includes generating a training data set that includes the plurality of BEV images and their associated target data structures and training the machine-learned model using the training data set, where the machine-learned model is configured to directly receive one or more of the BEV images from the plurality of BEV images.

Embodiments disclosed herein generally relate to a system that includes a vehicle, a first camera disposed on the vehicle, a birds-eye view (BEV) image, a machine-learned model, and a computer. The computer includes one or more computer processors and is configured to obtain a first image from the first camera, construct the BEV image from the first image, and process, with the machine-learned model, the BEV image to produce parking slot prediction data. The parking slot prediction data includes a first center coordinate for a first available parking slot, a first parking slot confidence, and a first corner displacement data. The first corner displacement data includes a first relative coordinate pair that locates a first corner relative to the first center coordinate and a second relative coordinate pair that locates a second corner relative to the first center coordinate. The computer is further configured to determine a first location of the first available parking slot using the parking slot prediction data and park the vehicle in the first available parking slot without the assistance of a driver when the first parking slot confidence meets a threshold.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
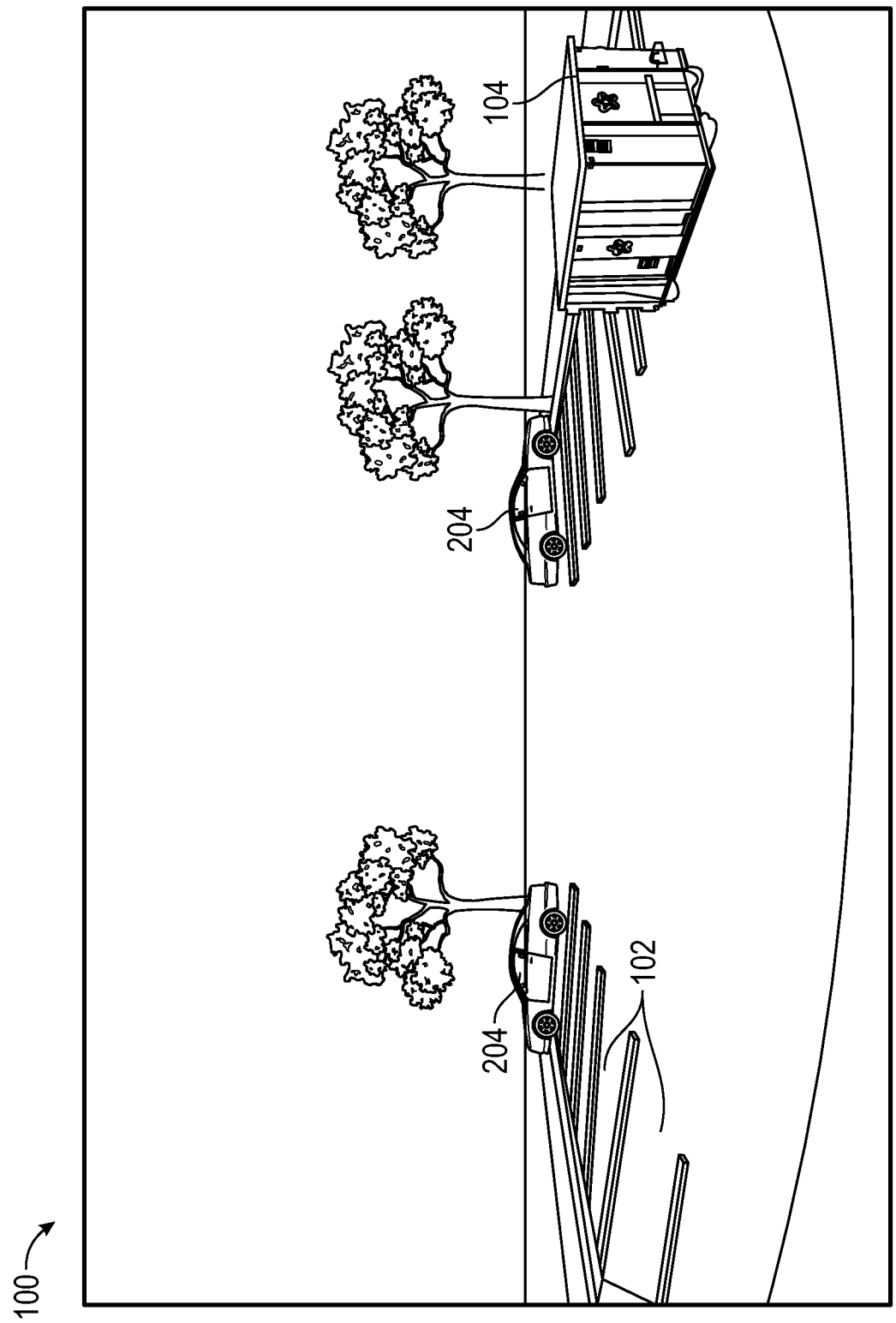
FIG. 1 depicts a parking lot in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "acoustic signal" includes reference to one or more of such acoustic signals.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-16, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Embodiments disclosed herein describe methods and systems to detect parking slots surrounding a vehicle using one or more images obtained from one or more cameras disposed on the vehicle. The parking slot detection methods and systems disclosed herein identify an available, or partially available, parking slot with a parking representation consisting of at least two corners, where each corner of the parking representation represents a specific corner of the parking slot. For example, in the case where the parking representation is a polygon with four corners, each of the four corners are explicitly indicated as one of: entrance-left, entrance-right, end-left, and end-right. Further the corner designations of a parking slot are mutually exclusive. Thus, the parking representation can directly conform to any orientation of parking slot, regardless of the relative viewpoint of the vehicle, without rotation or affine operations while simultaneously encoding corner relationships.

FIG. 1 depicts an example parking lot (100) containing parking slots (102). To avoid cluttering FIG. 1, a labelling line is not extended to each parking slot (102). A parking slot (102) may be occupied by a parked vehicle (204), or other object (e.g., trash container (104)), or unoccupied and potentially available. In some instances, the parking lot (100) may be outdoors (as shown), or indoors, for example, in a parking garage (not shown). In other instances, a parking slot (102) may reside near a roadway. The surface material of a parking slot (102) depends on its location and construction. A non-exhaustive list of parking slot (102) surface materials may include asphalt, concrete, brick, and pavers.

Figure 2A:
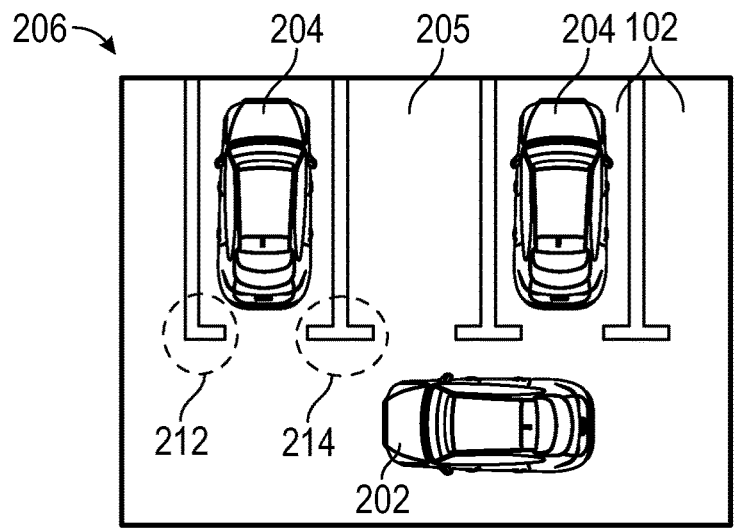
FIG. 2A depicts a perpendicular parking slot orientation in accordance with one or more embodiments.
Figure 2B:
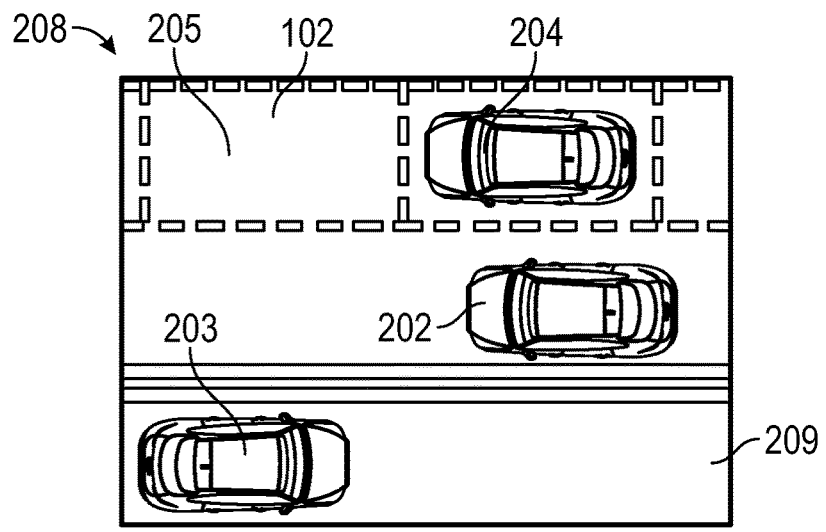
FIG. 2B depicts a parallel parking slot orientation in accordance with one or more embodiments.
Figure 2C:
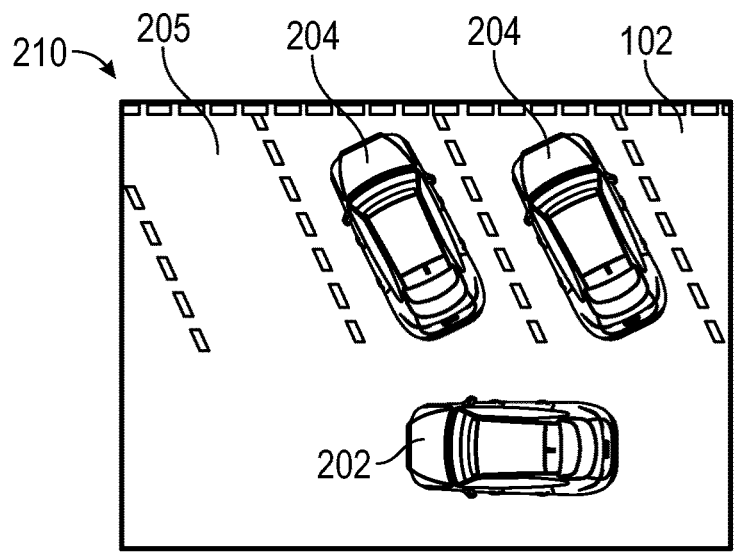
FIG. 2C depicts a fishbone parking slot orientation in accordance with one or more embodiments.

In general, a parking slot (102) has an associated slot orientation. FIGS. 2A-2C depict parking slots (102) with various slot orientations. Again, for clarity, not all parking slots (102) are labelled. FIGS. 2A-2C each depict a searching vehicle (202), or a vehicle that intends to park in an available parking slot, and one or more parked vehicles (204) that already reside in a parking slot (102). Further, FIGS. 2A-2C each depict at least one empty and available parking slot (205). FIG. 2B also depicts another vehicle (203) that is neither parked nor searching for an available parking slot (102). In particular, FIG. 2A depicts parking slots (102), available and occupied by parked vehicles (204), with a perpendicular slot orientation (206). FIG. 2B depicts parking slots (102) adjacent to a roadway (209), where the parking slots (102) have a parallel slot orientation (208). FIG. 2C depicts parking slots with a fishbone, or diagonal, slot orientation (210).

FIGS. 2A-2C further illustrate that parking slots (102) may be marked, in a variety of ways. For example, as seen in FIG. 2A, a parking slot (102) may be marked, or bounded, using solid lines. Or, as seen in FIGS. 2B and 2C, a parking slot (102) may be marked using dashed lines. In other instances, some or all of the markings defining a parking slot (102) may be implied (e.g., a curb, parking slot entrance, etc.), clearly shown, or ill-defined (e.g., faded). Further, the markings defining a parking slot (102) may partially enclose a parking slot (102), as seen in FIGS. 2A and 2C, or may fully enclose a parking slot, as seen in FIG. 2B. Additionally, and as illustrated in FIG. 2A, one or more corners of a parking slot (102) may be indicated using a "L-corner" marking (212) or a "T-corner" marking (214). In other instances, no corner marking is used (e.g., FIG. 2C).

In general, a parking slot (102) may be configured with any combination of the above-described features. That is, a parking slot (102) may possess any combination of surface material (asphalt, concrete, etc.), setting (e.g., indoor or outdoor, parking lot or street adjacent), slot orientation (perpendicular (204), parallel (208), fishbone (210)), marking line style (dashed, solid, mixed), corner designation (T-corner, L-corner, etc.), and marking enclosure (partially enclosed, fully enclosed). One with ordinary skill in the art will recognize that parking slots may be defined using alternative and/or additional features such as vehicle entry angle and parking slot width. As such, due to the breadth of parking slot (102) configurations and descriptive features, one with ordinary skill in the art will appreciate that not all parking slot (102) configurations need be enumerated herein without imposing a limitation on the instant disclosure.

As will be discussed later in the instant disclosure, the parking slot detection methods and systems disclosed herein work with parking slots (102) of any configuration. Further, the parking slot detection methods and systems disclosed herein are robust to additional factors such as environmental conditions (e.g., nighttime, rainy) and partial occlusion of parking slots (102).

Figure 3:
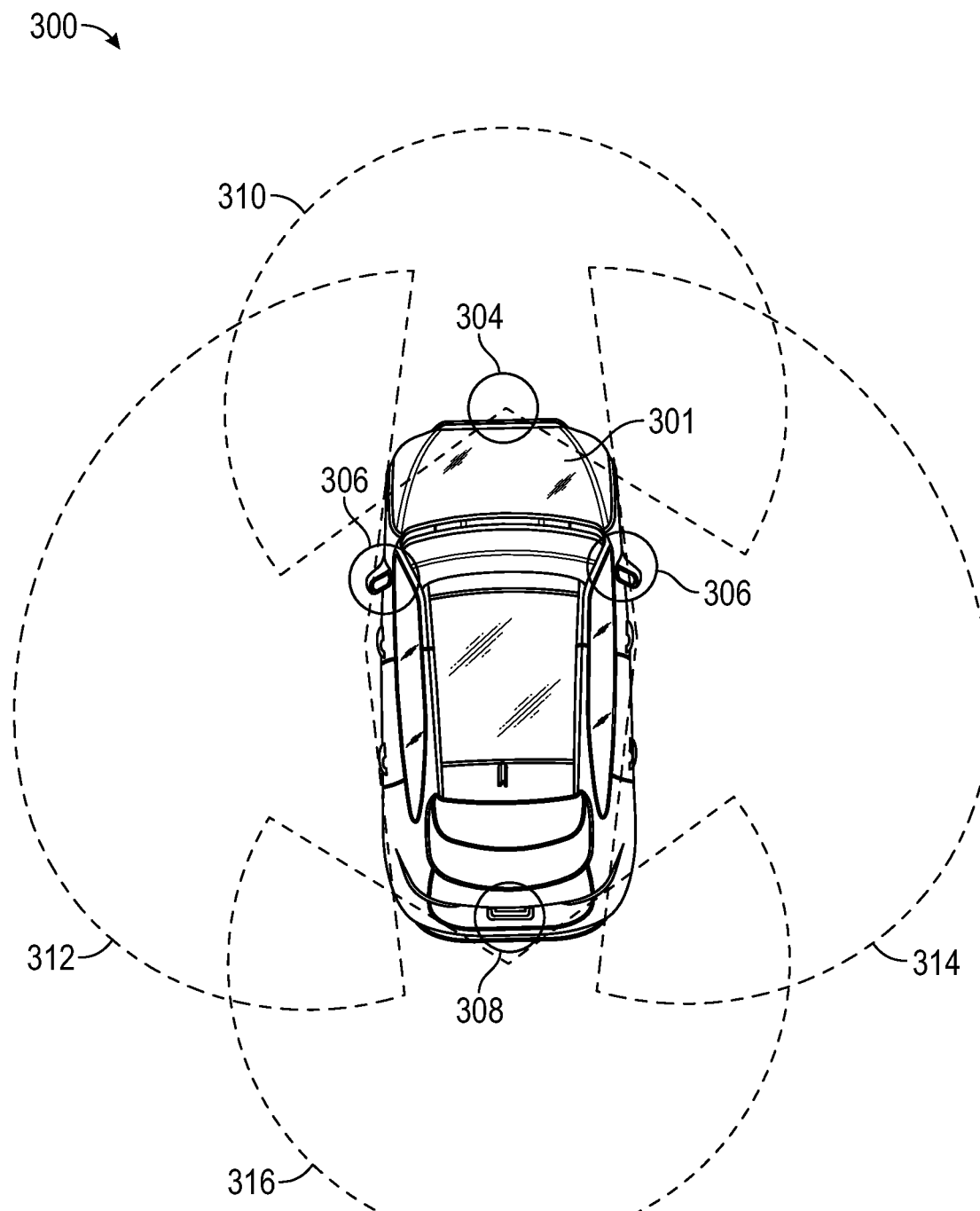
FIG. 3 depicts the field of view of a plurality of cameras disposed on a vehicle, in accordance with one or more embodiments.

FIG. 3 depicts a surrounding camera view (300) of a vehicle (301). In accordance with one or more embodiments, to detect parking slots (102) in the vicinity of the vehicle (301) (e.g., searching vehicle (202)), one or more cameras may be disposed on a vehicle (301). In one or more embodiments, one or more of the cameras may be outfitted with a fisheye lens. In other embodiments, one or more of the cameras disposed on the vehicle may be a pin-hole (i.e., conventional) camera. In FIG. 3, a camera is not explicitly illustrated. However, in FIG. 3, the locations of four cameras disposed on the vehicle (301) are indicated with a circle. In general, each of the one or more cameras disposed on a vehicle (301) may be relatively small compared to the vehicle (301). As such, due to its small size, a camera may be disposed on the vehicle (301) so that it is generally unnoticeable and does not hinder any functionality of the vehicle (301). Further, each of the one or more cameras may be concealed (e.g., tucked under a piece of trim), and ruggedized (i.e., able to withstand vibrations, operational through a wide range of temperatures, waterproof, etc.).

FIG. 3 depicts a front-facing camera (304), two side-facing cameras (306), and a rear-facing camera (308). The number of cameras disposed on a vehicle (301), and the location of the cameras, is not limited to that depicted in FIG. 3. In other embodiments, fewer or more cameras may be used. For example, in one or more embodiments, a camera (or a system of cameras) with surround view capabilities may be disposed on top of the vehicle (301).

A camera has a field of view (FOV). Field of view is used herein as a general term intended to indicate the extent of the observable world that is seen by a camera. Stated more technically, the field of view is a solid angle through which the detector of a camera is sensitive to electromagnetic radiation. The field of view of each of the four cameras disposed on the vehicle (301) depicted in FIG. 3 is shown with a dashed closed curve. The front-facing camera (304) has a front-facing FOV (310) such that the front-facing camera (304) may acquire images of the environment in front of the vehicle (301). Likewise, the side-facing cameras (306) are associated with either the left-facing FOV (312) or right-facing FOV (314), where the terms "left" and "right" are relative to the top-down view of the vehicle (301) shown in FIG. 3. Finally, the rear-facing camera (308) has a rear-facing FOV (316) such that the rear-facing camera (308) may acquire images of the environment to the rear of the vehicle (301). As depicted in FIG. 3, the fields of view of the cameras partially overlap such that the entire surrounding environment of the vehicle (301) is captured by the cameras. In other words, a set of images acquired by the cameras disposed on the vehicle (301) at a given instant in time can be said to capture the surroundings of the vehicle (301) at that time. As previously stated, in some instances, the entire surrounding environment of the vehicle (301) may be captured using a camera system, the system consisting of one or more cameras, disposed on top of the vehicle (301).

Continuing with the example of FIG. 3, it is noted that the placement of the one or more cameras disposed on the vehicle (301) (e.g., the height of the one or more cameras relative to the ground) can directly affect the field(s) of view of the one or more cameras and the visibility of parking slots (102) in the vicinity of the vehicle (301). One with ordinary skill in the art will appreciate that the height of the one or more cameras disposed on the vehicle (301) may be adjusted and/or selected to optimize the view of the cameras without departing from the scope of this disclosure. Further, the one or more cameras may be placed such that any viewpoint of the one or more cameras is not hindered by the vehicle (301).

Figure 4:
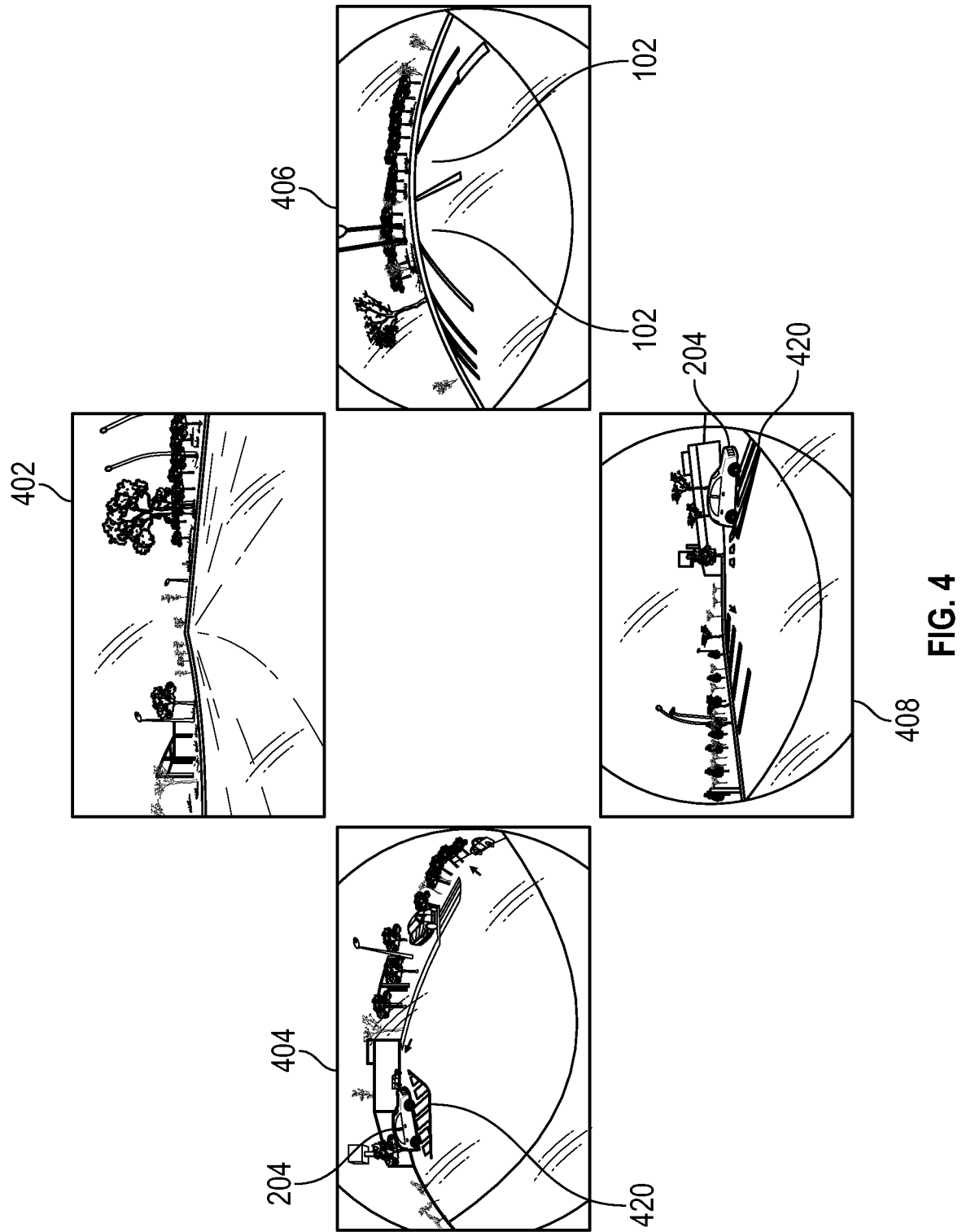
FIG. 4 depicts images acquired from a plurality of cameras disposed on a vehicle in accordance with one or more embodiments.

FIG. 4 depicts an example of four images, where each image is acquired using one of the four cameras disposed on a vehicle (301) as demonstrated in FIG. 3. Because each image is associated with a given camera disposed on the vehicle (301), the images may be described as a front image (402) (from the front-facing camera (304)), a left image (404) (from the side-facing camera (306) with the left-facing FOV (312)), a right image (406) (from the side-facing camera (306) with the right-facing FOV (314)), and a rear image (408) (from the rear-facing camera (308)). The example images have overlapping fields of view and form a surrounding camera view (300). The overlap of the fields of view is denoted because a parked vehicle (204) appears in both the left image (404) and the rear image (408).

The example images of FIG. 4 were acquired at an instance in time when the vehicle (301), on which the cameras are disposed, was traversing through a parking lot (100). As seen in FIG. 4, the parking lot (100) is outdoors and contains parking slots (102), where not all parking slots (102) are labelled in FIG. 4. The parking slots (102) of FIG. 4 are of a perpendicular slot orientation (206) and are each marked with partially enclosed solid lines. Specifically, the two side boundaries of each parking slot (102) are each marked with a solid line, the far-end of the parking slots (102) is implicitly marked with a curb, and the entry side of the parking slots (102) is left unmarked. Further, an unavailable region (420) of the parking lot (100) can be seen in the example images of FIG. 4.

Figure 5:
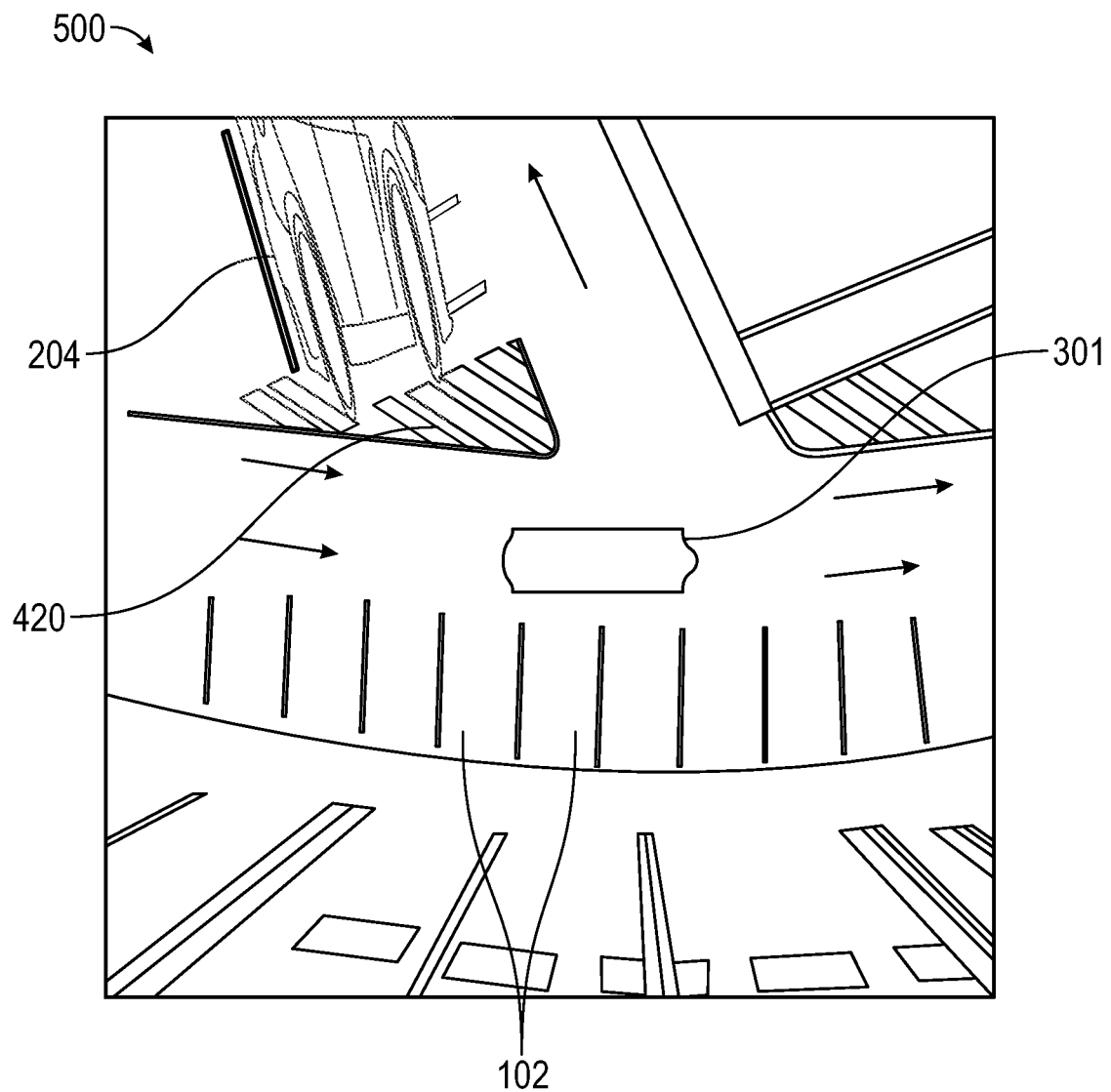
FIG. 5 depicts an example birds-eye view (BEV) image in accordance with one or more embodiments.

In accordance with one or more embodiments, images acquired from one or more cameras disposed on a vehicle (301) are stitched together to create a birds-eye view (BEV) image, or representation, of the surrounding environment of the vehicle (301). In one or more embodiments, the BEV image is created from the images acquired from the one or more cameras disposed on the vehicle (301) using a technique commonly known as inverse perspective mapping (IPM). Typically, IPM assumes that the surrounding environment of a vehicle (301) is flat and, once calibrated, maps the pixels of the image onto a flat plane through homography projection. FIG. 5 depicts an example BEV image (500) constructed from the example images of FIG. 4. The example BEV image (500) displays the surrounding environment of the vehicle (301) (the parking lot (100)), including the parking slots (102), the unavailable region (420) and the parked vehicle (204). Again, to avoid cluttering the figure, it is noted that not every parking slot (102) is labelled. As seen, the IPM often causes distortion of non-planar objects. For example, the parked vehicle (204) appears stretched as if extending to a point at infinity in FIG. 5. However, the BEV image, generally, does not strongly influence the representation of the parking slots (102), and other planar objects, such that the BEV image can be used for parking slot (102) identification and localization.

In one or more embodiments, the vehicle (301) may be outfitted with additional sensory systems. These sensory systems may include an ultrasonic system and a light detection and ranging (LiDAR) system each composed of one or more sources (e.g., ultrasonic transmitter, laser) and receivers or sensors. In one or more embodiments, sensory data received from the additional sensory system(s) complements the BEV image and is used to aid in the localization of the vehicle (301) and parking slots (102) in the BEV image.

Figure 6:
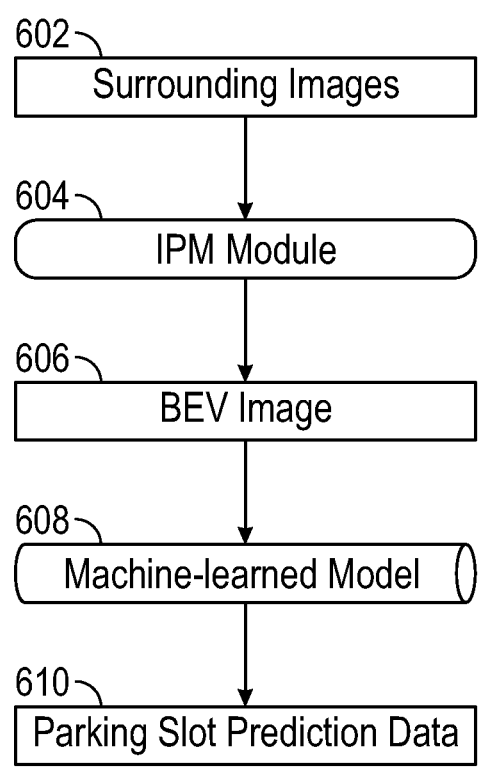
FIG. 6 depicts a system in accordance with one or more embodiments.

A high-level overview of the parking slot detection method is shown in FIG. 6, in accordance with one or more embodiments. As seen, one or more surrounding images (602) are acquired using one or more cameras disposed on a vehicle (301). Here, the term surrounding image simply refers to an image that captures, at least a part of, the surrounding environment of the vehicle (301). In one or more embodiments, the cameras disposed on the vehicle (301) are equipped with fisheye lenses and have an image resolution of 1280 by 800 pixels. Hereafter, for simplicity, it will be assumed that there are at least two surrounding images such that the surrounding images (602) may be referenced as a plural without ambiguity. However, it is emphasized that the embodiments disclosed herein may operate, without limitation, with a single surrounding image (602). As such, there is no requirement that the surrounding images (602) be composed of more than one image. The surrounding images (602), as the name implies, are images of the local environment of the vehicle (301) at an instance in time. The surrounding images (602) are processed with an inverse perspective mapping (IPM) module (604) which applies the IPM technique to the surrounding images (602) to form a BEV image (606). It is noted that in one or more embodiments, such as when a surrounding view camera system disposed on top of the vehicle (301) is used, a BEV image (606) may be formed without the IPM module (604). In one or more embodiments, the resulting BEV image (606), has an image resolution of 640 by 640 pixels and spans a physical area of 25 meters by 25 meters. In this embodiment, a single dimension of a pixel corresponds to 3.9 centimeters. Further, in accordance with one or more embodiments, the vehicle (301) is centered within the BEV image (606). Thus, the BEV image (606) may depict parking slots (102) that are at a distance up to 12.5 meters from the vehicle (301). That is, in one or more embodiments, the detection area of the vehicle (301) is 25 meters by 25 meters, where the detection area is centered on the vehicle (301). It is noted that the detection area may be altered through adjustments to the one or more cameras (e.g., camera type, camera placement, etc.) such that the detection area is not limited to 25 meters by 25 meters but may be less than or greater than this in other embodiments. Keeping with FIG. 6, the BEV image (606) is processed with a machine-learned model (608) to produce parking slot prediction data (610). The machine-learned model (608) will be described in greater detail below. However, for now it is stated that the machine-learned model (608) is trained and configured to accept as an input the BEV image (606) and locate parking slots (102) depicted in the BEV image (606) regardless of the configuration of the parking slots (102) and other environmental factors (e.g., time of day, weather conditions). The output of the machine-learned model (608) is the parking slot prediction data (610) which contains the locations of the corners (two or more) of parking representations for all identified parking slots (102) shown in the given BEV image (606), as well as indications of the slot surface material and confidence level for each parking slot (102). Further, using the parking slot prediction data (610), entry line data and slot orientation may be determined for each parking slot (102).

Figure 7A:
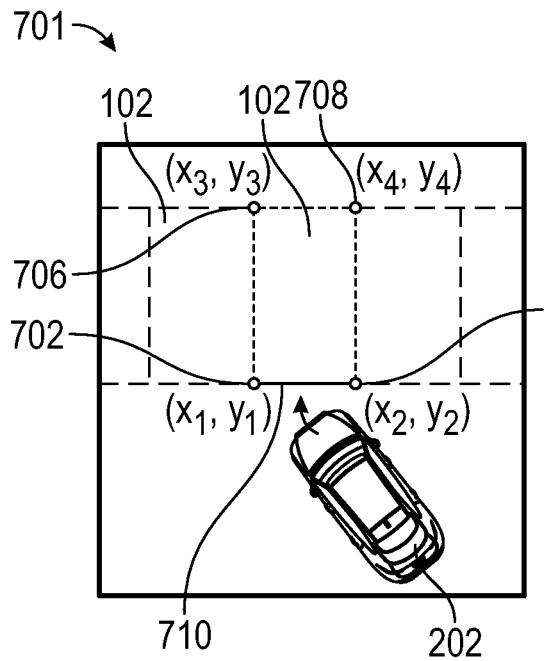
FIG. 7A depicts a parking slot defined with absolute coordinates in accordance with one or more embodiments.
Figure 7B:
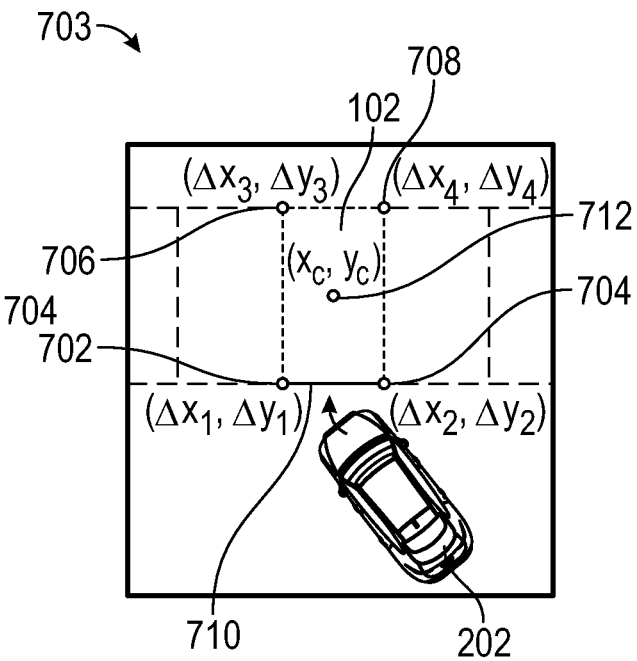
FIG. 7B depicts a parking slot defined with center-relative coordinates in accordance with one or more embodiments.
Figure 7C:
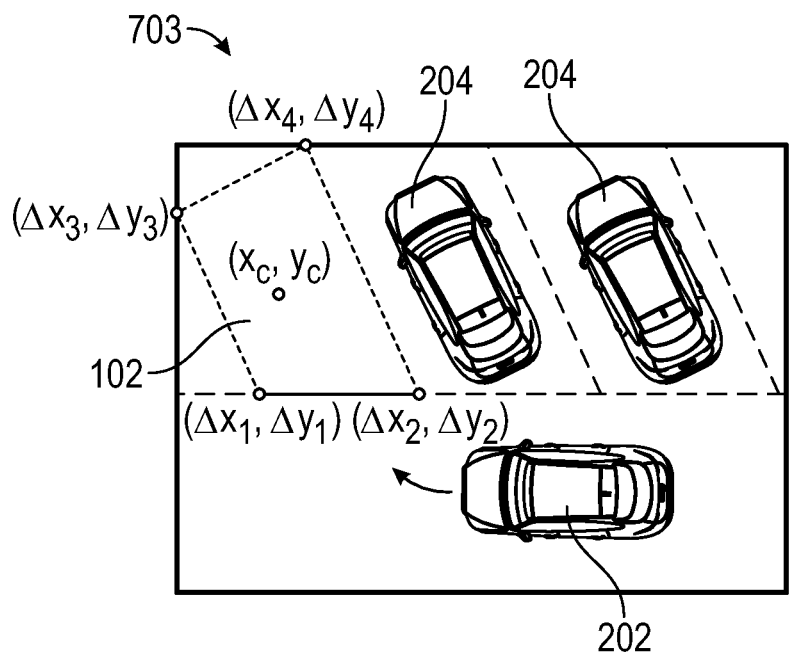
FIG. 7C depicts a fishbone parking slot defined with center-relative coordinates in accordance with one or more embodiments.

To better understand the output contained in the parking slot prediction data (610), it is useful to illustrate how the parking slots (102) are represented by parking representations. In accordance with one or more embodiments, a four-sided parking representation is used to represent a parking slot (102) by enveloping the area of the parking slot (102). A four-sided parking representation has four corners. In one or more embodiments, each corner of the parking representation indicates a specific corner of the parking slot (102). That is, the four corners are explicitly indicated as one of: entrance-left, entrance-right, end-left, and end-right. Further the corner designations of a parking slot are mutually exclusive. FIGS. 7A-7C each depict a parking slot (102) represented with a four-sided parking representation and a searching vehicle (202) that intends to enter and park in the detected parking slot (102). Again, it is noted that not all parking slots (102) in FIGS. 7A-7C are labelled to avoid unnecessarily cluttering the figures.

Turning to FIG. 7A, the parking representation has four uniquely labelled corners; namely, the entrance-left corner (702), the entrance-right corner (704), the end-left corner (706), and the end-right corner (708). It is noted that the designations of "left" and "right" can be relative to the orientation of the vehicle, relative to the BEV image (606), or relative to any other fixed datum so long as the relative designations are consistently applied. In general, the parking representation is fully defined by describing the location of its corners when the corner designations are known and a parking representation can use two or more corners. Given that the pixels of the BEV image (606) are spatially distributed over a plane, the coordinate system is two-dimensional with axes parallel to the edges of the BEV image (606). For example, in one or more embodiments, an x-axis is defined to run along the width of the BEV image (606) and a y-axis is defined to run along the height of the BEV image (606). The origin of the coordinate system can be arbitrarily defined so long as it remains fixed across all provided BEV images (606). In one or more embodiments, the origin of the coordinate system is located at the center of each provided BEV image (606). Further, it is noted that the center of the BEV image (606) is typically aligned with the center of the rear axle of the vehicle (301) as is a common standard. The units of the coordinate system can be readily transformed between pixel space and physical space such that the parking slot detection methods and systems disclosed herein are not limited to any choice of units. Further, in one or more embodiments, the coordinate system may use normalized units. For example, the x-axis and y-axis coordinates may be given relative to the width and height of the BEV image (606), respectively, in either pixel or physical space. In one or more embodiments, and as will be given greater context later in the instant disclosure, the coordinate system used with a BEV image (606) may be defined piecewise using a grid of cells overlaid on the BEV image (606). In this case, the coordinate systems may be normalized according to the width and height of each grid cell.

The location of the parking representation corners can be described using absolute or center-relative coordinates. The parking representation representing a parking slot (102) in FIG. 7A uses absolute coordinates (701). In this case, each corner is directly located by specifying its location on the x and y axes using a coordinate pair (x,y). Again, these coordinates may be normalized and may reference an origin defined by the BEV image (606) or an origin defined by a grid cell of the BEV image (606). To distinguish the coordinate pair of a corner from any other corner of the parking representation, each coordinate pair is labelled with an index according to its associated corner. In FIGS. 7A-7C, which use four corners, the entrance-left corner (702) is indexed with the number 1, the entrance-right corner (704) uses the index of 2, the end-left corner (706) uses the index of 3, and the end-right corner (708) is indexed with the number 4. Thus, for example, using absolute coordinates (701) as seen in FIG. 7A, the location of the end-right corner (708) is given by the coordinate pair ($x_4$, $y_4$). The assignation of a corner to an index is arbitrary and one with ordinary skill in the art will recognize that any choice of mutually exclusive indices may be used with the corners of the parking representations, so long as the choice is consistently applied, such that the indices demonstrated herein do not represent a limitation on the instant disclosure. Under absolute coordinates (701), given that an indexed coordinate pair (e.g., ($x_1$, $y_1$)) indicates both which corner is being referenced and where that corner is located, a parking representation enclosing the area of a parking slot (102) is fully defined using indexed coordinate pairs (one for each of the corners of the parking representation). This is seen in FIG. 7A, where a rectangular-shaped parking representation is drawn using the coordinate pairs ($x_1$, $y_1$), ($x_2$, $y_2$), ($x_3$, $y_3$), and ($x_4$, $y_4$).

FIG. 7B depicts the same rectangular-shaped parking representation as in FIG. 7A using center-relative coordinates (703). Like before, the parking representation is fully defined by localizing its specified (e.g., indexed) corners. Identical to FIG. 7A, the entrance-left corner (702) is given the index of 1, the entrance-right corner (704) the index of 2, the end-left corner (706) the index of 3, and the end-right corner (708) the index of 4. Additionally, in FIG. 7B, a coordinate pair that indicates the center point of the parking representation is given as a coordinate pair, ($x_c$, $y_c$). The coordinate pair representing the center of the parking representation is referred to herein as the center coordinate (712). The center coordinate (712) is related to the coordinate pairs of the corners under the absolute coordinates (701) as $$(x_c, y_c) = \left(\frac{1}{N}\sum_{i=1}^{N} x_i, \frac{1}{N}\sum_{i=1}^{N} y_i\right),$$

where N indicates the number of corners used in the parking representation. In the examples of FIGS. 7A-7C, N=4. However, in general a parking representation may be defined using N≥2. In the case where a parking representation is defined using two corners, the corners may be considered diagonally opposite corners of a rectangle. Thus, two corners may be used to define a parking representation enclosing a surface with finite area and are not limited to only defining a line segment.

Using center-relative coordinates (703), as shown in FIG. 7B, the corners of the parking representation are localized relative to the center coordinate (712). That is, the coordinate pair for each corner is written as a relative coordinate pair indicating the displacement along the x and y axes from the center coordinate (712). For example, using center-relative coordinates (703), the location of the entrance-left corner (702) is given by the relative coordinate pair ($\Delta x_1$, $\Delta y_1$). Similar relative coordinate pairs may be formed for the remaining corners. Mathematically, the relative coordinate pair using center-relative (703) coordinates for an $n^{th}$ corner is related to the coordinate pair using absolute coordinates (701) according to the relationship $(x_n, y_n)(x_c+\Delta x_n, y_c+\Delta y_n).$ In the examples of FIGS. 7A-7C where the parking representation is a polygon with four corners, the relative coordinate pairs are related to the coordinated pairs as:

$(x_1, y_1) = (x_c + \Delta x_1, y_c + \Delta y_1),$ $(x_2, y_2) = (x_c + \Delta x_2, y_c + \Delta y_2),$ $(x_3, y_3) = (x_c + \Delta x_3, y_c + \Delta y_3),$ $(x_4, y_4) = (x_c + \Delta x_4, y_c + \Delta y_4).$ In accordance with one or more embodiments, the machine-learned model (608) is configured using center-relative coordinates (703). FIG. 7C depicts another example of a parking representation of a parking slot (102) using center-relative coordinates (703). For concision, not every parking slot (102) and parking representation corner is labelled in FIG. 7C. The parking representation in FIG. 7C, which is defined no differently than the rectangular-shaped parking representation of FIG. 7B, is not rectangular. FIG. 7C is provided to emphasize an advantage of the instant disclosure. Namely, the parking representation can directly conform to and represent any orientation and shape (including non-rectangular shapes) of parking slot (102) without additional rotation or affine operations regardless of the relative viewpoint of the vehicle (301). This poses a significant advantage over existing parking detection systems which are limited to representing parking slots (102) as rectangles or can only detect parking slots (102) of a given orientation relative to the vehicle (301).

Additionally, an advantage of providing a specific designation to each corner (e.g., entrance-left corner (702) as opposed to a corner), is that an entry line (710) that indicates the border of the parking slot (102) that the vehicle (301) (searching vehicle (202)) should enter can be readily determined. In accordance with one or more embodiments, the entry line (710) is defined by a straight line connecting the entrance-left corner (702) and the entrance-right corner (704). Mathematically, the entry line (710) of a parking representation is given by the set of points $$\{x_e, y_e : x_e = x_1(\lambda) + x_2(1-\lambda), \ y_e = y_1(\lambda) + y_2(1-\lambda)\},$$

$$\{x_e, y_e : x_e = x_1(\lambda) + x_2(1-\lambda), \ y_e = y_1(\lambda) + y_2(1-\lambda)\},$$

where $\lambda$ is a continuous variable with a domain [0,1].

In one or more embodiments, more than one entry lines may be determined for any detected parking slot (102). For example, in one or more embodiments, a parking representation is used with one or more additional object detectors capable of localizing other objects such as vehicles and streets. In these cases, the spatial relationship between a parking slot (102) and surrounding objects is used to determine one or more entry lines for the parking slot (102). As an example, in FIG. 7A the searching vehicle (202) has detected an available parking slot (102) that is bounded on the top and bottom by open areas (e.g., streets) and bounded on the sides by other available parking slots. Thus, this information may be used to determine that any of the line segments directly connecting adjacent corners of the parking representation may be considered as a valid entry line.

Figure 8:
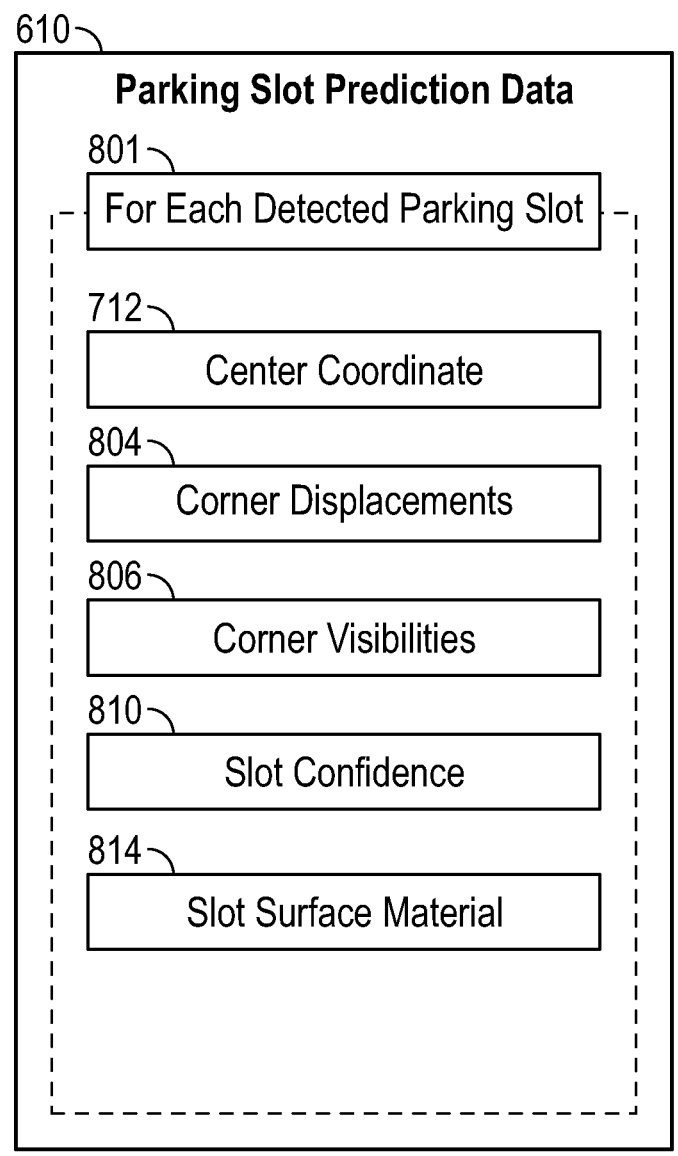
FIG. 8 depicts the output data structure of a machine-learned model in accordance with one or more embodiments.

FIG. 8 depicts the information included in the parking slot prediction data (610) in greater detail. As depicted in the example BEV image (500) of FIG. 5, a BEV image (606) may contain more than one parking slots (102). In general, a BEV image (606) may contain zero or more parking slots (102). The parking slot prediction data (610) includes individual information for each detected parking slot (701) in the BEV image (606) provided to the machine-learned model (608). Specifically, for each detected parking slot (801), the parking slot prediction data (610) contains: the predicted center coordinate (712); the center-relative coordinate pairs for each of the corners of the parking representation, collectively known as the corner displacements (804); a confidence score between 0 and 1 indicating the visibility of each corner where the confidence scores are collectively known as the corner visibilities (806); a slot confidence score (810) between 0 and 1 indicating the confidence that a parking representation formed used the center coordinate (712) and the corner displacements (804) accurately encloses an available parking slot (102); and a categorical prediction of the parking slot surface material (814). Further, using the parking slot prediction data (610) a categorical prediction of the parking slot orientation (i.e., perpendicular, parallel, fishbone) may be calculated for each parking slot (102). That is, in one or more embodiments, the orientation of each parking slot (102) is determined through a post-processing technique using the parking slot prediction data (610).

Upon receiving a BEV image (606), the machine-learned model (608) outputs the parking slot prediction data (610). The parking slot prediction data (610) contains all the information required to positively identify (according to a confidence; slot confidence (810)) and localize available parking slots (102) in the BEV image (606). The BEV image (606) represents the local surrounding of a vehicle (301). Further, BEV image (606) can be mapped spatially to the physical space surrounding the vehicle. Thus, the parking slot prediction data (610) can be used to physically detect (identify and localize) available parking slots (102) local to the vehicle (102) and the parking slot prediction data (610) can be used with on-board driver assistance systems to automatically (i.e., without driver input) park the vehicle (301).

Figure 9:
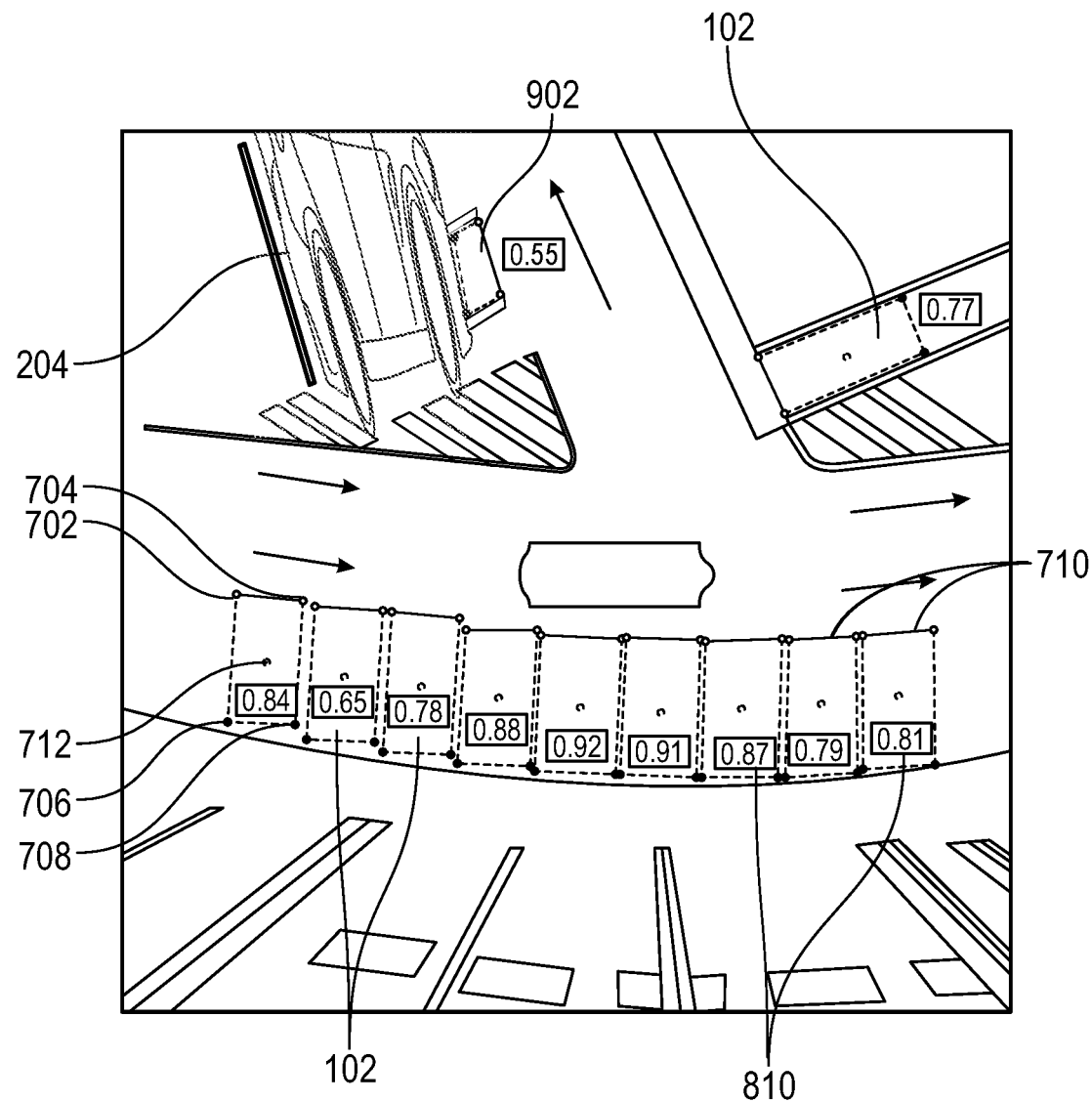
FIG. 9 depicts an example BEV image marked with predicted parking slot data in accordance with one or more embodiments.

FIG. 9 depicts the example BEV image (500) of FIG. 5 where the parking slot prediction data (610), as output by the machine-learned model (608), has been used to mark the example BEV image (500). As seen in FIG. 9, the use of the center coordinate (712) and the corner displacements (804) (where the present example uses four corners) allow for a four-sided parking representation to be drawn around each detected available parking slot (102). Additionally, the entry line (710) of each parking slot (102) is determined and the slot confidence (810) of each parking slot (102) is marked in FIG. 9. FIG. 9 also depicts the detection of an occluded parking slot (902). The occluded parking slot is partially blocked from the viewpoint of the vehicle (301) by a parked vehicle (204). Thus, for the parking representation representing the occluded parking slot (902), the corner visibilities of the end-left corner (706) and the end-right corner (708) are expected to be close to the value of zero, or made zero through a thresholding operation, indicating that these corners are not visible. Finally, as can be inferred from FIG. 9, the parking representations can be used to readily determine the surface area and entry line width of the detected parking slots (102). It is noted, that to avoid cluttering FIG. 9, not every parking slot (102) is referenced nor is every corner, center coordinate (712), entry line (710), and slot confidence (810) referenced (with a numeric label and line) for each parking slot (102) in FIG. 9.

As stated, a machine-learned model (608) is used to produce the parking slot prediction data (610) from a BEV image (606). Machine learning, broadly defined, is the extraction of patterns and insights from data. The phrases "artificial intelligence", "machine learning", "deep learning", and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning, or machine-learned, will be adopted herein, however, one skilled in the art will recognize that the concepts and methods detailed hereafter are not limited by this choice of nomenclature.

One with ordinary skill in the art will recognize that the field and concepts encompassed by machine learning are both too broad and too deep to be given an adequate description herein. However, to provide requisite context for the machine-learned model employed by one or more embodiments of the present invention, a minimal description of neural networks and convolutional neural networks is given in the following paragraphs. It is emphasized that the following descriptions are intended to provide a cursory understanding of some machine-learned methods and models and should not be considered limiting on the present disclosure.

Figure 10:
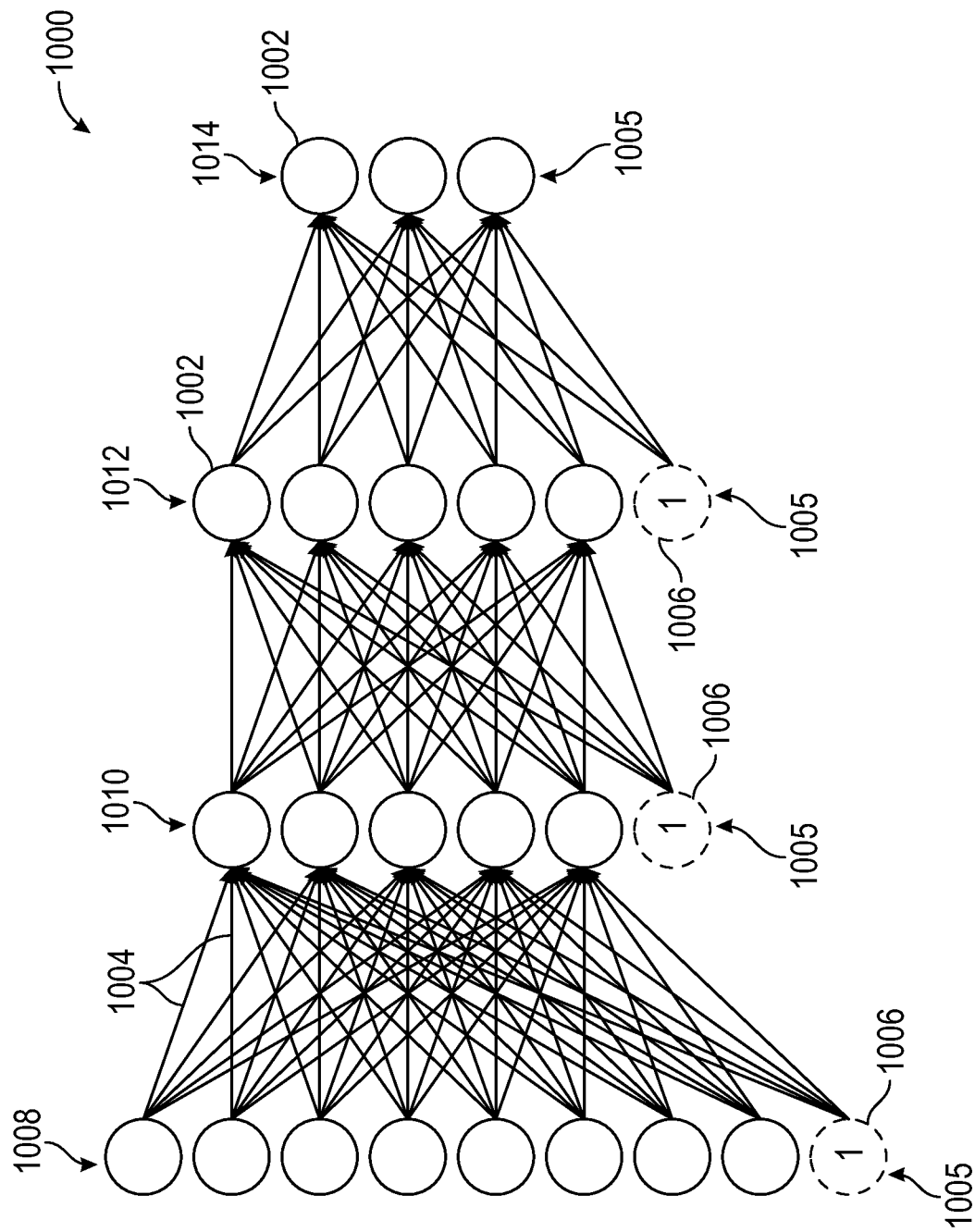
FIG. 10 depicts a neural network in accordance with one or more embodiments.

One type of machine-learned model is a neural network. A neural network may often be used as a subcomponent of a larger machine-learned model. A diagram of a neural network is shown in FIG. 10. At a high level, a neural network (1000) may be graphically depicted as being composed of nodes (1002), where in FIG. 10 any circle represents a node, and edges (1004), shown in FIG. 10 as directed lines. The nodes (1002) may be grouped to form layers (1005). FIG. 10 displays four layers (1008, 1010, 1012, 1014) of nodes (1002) where the nodes (1002) are grouped into columns, however, the grouping need not be as shown in FIG. 10. The edges (1004) connect the nodes (1002). Edges (1004) may connect, or not connect, to any node(s) (1002) regardless of which layer (1005) the node(s) (1002) is in. That is, the nodes (1002) may be sparsely and residually connected. However, when every node (1002) in a layer is connected to every node in an adjacent layer (1002), the layer is said to be densely, or fully, connected. If all layers in a neural network (1000) are densely connected, the neural network (1000) may be said to be a dense, or densely connected (or fully connected), neural network (1000). A neural network (1000) will have at least two layers (1005), where the first layer (1008) is considered the "input layer" and the last layer (1014) is the "output layer." Any intermediate layer (1010, 1012) is usually described as a "hidden layer." A neural network (1000) may have zero or more hidden layers (1010, 1012) and a neural network (1000) with at least one hidden layer (1010, 1012) may be described as a "deep" neural network or a "deep learning method." As such, in some embodiments, the machine-learned model is a deep neural network. In general, a neural network (1000) may have more than one node (1002) in the output layer (1014). In this case the neural network (1000) may be referred to as a "multi-target" or "multi-output" network.

Nodes (1002) and edges (1004) carry additional associations. Namely, every edge is associated with a numerical value. The edge numerical values, or even the edges (1004) themselves, are often referred to as "weights" or "parameters." While training a neural network (1000), numerical values are assigned to each edge (1004). Additionally, every node (1002) is associated with a numerical variable and an activation function. Activation functions are not limited to any functional class, but traditionally follow the form $$A = f\left(\sum_{j \in (incoming)} ((node\ value)_j (edge\ value)_j)\right),$$

$$A = f\left(\sum_{j \in (incoming)} ((node\ value)_j (edge\ value)_j)\right),$$

where j is an index that spans the set of "incoming" nodes (1002) and edges (1004) and $f$ is a user-defined function. Incoming nodes (1002) are those that, when viewed as a graph (as in FIG. 10), have directed arrows that point to the node (1002) where the numerical value is being computed. Some functions for $f$ may include the linear function $f(x)=x$, sigmoid function $$f(x) = \frac{1}{1+e^{-x}},$$

and rectified linear unit function $f(x)=\max(0, x)$, however, many additional functions are commonly employed. Every node (1002) in a neural network (1000) may have a different associated activation function. Often, as a shorthand, activation functions are described by the function $f$ by which it is composed. That is, an activation function composed of a linear function $f$ may simply be referred to as a linear activation function without undue ambiguity.

When the neural network (1000) receives an input, the input is propagated through the network according to the activation functions and incoming node (1002) values and edge (1004) values to compute a value for each node (1002). That is, the numerical value for each node (1002) may change for each received input. Occasionally, nodes (1002) are assigned fixed numerical values, such as the value of 1, that are not affected by the input or altered according to edge (1004) values and activation functions. Fixed nodes (1002) are often referred to as "biases" or "bias nodes" (1006), displayed in FIG. 10 with a dashed circle.

In some implementations, the neural network (1000) may contain specialized layers (1005), such as a normalization layer (batch or layer-wise normalization may occur) or a dropout layer, or additional connection procedures, like concatenation. One with ordinary skill in the art will appreciate that these alterations do not exceed the scope of this disclosure.

As noted, the training procedure for the neural network (1000) comprises assigning values to the edges (1004). To begin training, the edges (1004) are assigned initial values. These values may be assigned randomly, assigned according to a prescribed distribution, assigned manually, or by some other assignment mechanism. Once edge (1004) values have been initialized, the neural network (1000) may act as a function, such that it may receive inputs and produce an output. As such, at least one input is propagated through the neural network (1000) to produce an output. A data set, commonly known as a training set or training data is supplied to the neural network (1000) during training. The training set is composed of inputs and associated target(s), where the target(s) represent the "ground truth", or the otherwise desired output. The inputs are processed by the neural network (1000) and the output of the neural network (1000) is compared to the associated target(s) of the input data. The comparison of the neural network (1000) output to the target(s) is typically performed by a so-called "loss function;" although other names for this comparison function such as "error function," "objective function," "value function," and "cost function" are commonly employed. Many types of loss functions are available, such as the mean squared error function, however, the general characteristic of a loss function is that the loss function provides a numerical evaluation of the similarity between the neural network (1000) output and the associated target(s). In some implementations, the loss function may be composed of multiple loss functions applied to different portions of the output-target comparison. The loss function may also be constructed to impose additional constraints on the values assumed by the edges (1004), for example, by adding a penalty term, which may be physics-based, or a regularization term. Generally, the goal of a training procedure is to alter the edge (1004) values to promote similarity between the neural network (1000) output and associated target(s) over the data set. Thus, the loss function is used to guide changes made to the edge (1004) values, typically through a process called "backpropagation."

While a full review of the backpropagation process exceeds the scope of this disclosure, a brief summary is provided. Backpropagation consists of computing the gradient of the loss function over the edge (1004) values. The gradient indicates the direction of change in the edge (1004) values that results in the greatest change to the loss function. Because the gradient is local to the current edge (1004) values, the edge (1004) values are typically updated by a "step" in the direction indicated by the gradient. The step size is often referred to as the "learning rate" and need not remain fixed during the training process. Additionally, the step size and direction may be informed by previously seen edge (1004) values or previously computed gradients. Such methods for determining the step direction are usually referred to as "momentum" based methods.

Once the edge (1004) values have been updated, or altered from their initial values, through a backpropagation step, the neural network (1000) will likely produce different outputs. Thus, the procedure of propagating at least one input through the neural network (1000), comparing the neural network (1000) output with the associated target(s) with a loss function (where the comparison may be done piecewise with more than one loss function), computing the gradient of the loss function with respect to the edge (1004) values, and updating the edge (1004) values with a step guided by the gradient, is repeated until a termination criterion is reached. Common termination criteria are: reaching a fixed number of edge (1004) updates, otherwise known as an iteration counter; a diminishing learning rate; noting no appreciable change in the loss function between iterations; reaching a specified performance metric as evaluated on the training data or a separate hold-out data set. Once the termination criterion is satisfied, and the edge (1004) values are no longer intended to be altered, the neural network (1000) is said to be "trained." It is noted that depending on the construction of the loss function, in some cases similarity between the target(s) and the neural network (1000) output may be promoted by minimizing the loss function. In other cases, the objective may be to maximize the loss function (if maximization is the goal, the loss function is usually referred to as an objective or value function). One with ordinary skill in the art will appreciate that tasks of maximization and minimization can be made equivalent through techniques such as negation. In other words, when updating the edge (1004) values with a step guided by the gradient, depending on the construction of the loss function, the step may be in the direction of the gradient or in a direction opposite to the gradient.

A machine-learned model architecture defines the entire structure of a machine-learned model. For example, in the case of a neural network (1000), the number of hidden layers in the network, the type of activation function(s) used, and the number of outputs must be specified. Additionally, the use of, and location of, specialized layers such as batch normalization must be defined. Each of these choices, for example, the choice of how many hidden layers are in a neural network (1000), is said to be a hyperparameter of the machine-learned model. In other words, a machine-learned model architecture specifies the hyperparameters surrounding the machine-learned model. Note that a machine-learned model architecture does not describe the values of the edges (weights, parameters) of the machine-learned model. These must be learned during training or are otherwise specified when using a pre-trained model.

Another type of machine-learned model is a convolutional neural network (CNN). A CNN is similar to a neural network (1000) in that it can technically be graphically represented by a series of edges (1004) and nodes (1002) grouped to form layers. However, it is more informative to view a CNN as structural groupings of weights; where here the term structural indicates that the weights within a group have a relationship. CNNs are widely applied when the input data also possesses a structural relationship, for example, a spatial relationship where one element of the input is always considered "to the left" of another element of the input. For example, an image has a structural relationship as each pixel (element) has a directional relationship with respect to its adjacent pixels.

A structural grouping, or group, of weights is herein referred to as a "filter." The number of weights in a filter is typically much less than the number of elements in an input (e.g., pixels in an image). In a CNN, the filters can be thought as "sliding" over, or convolving with, the input data to form an intermediate output or intermediate representation of the input data which still possesses a structural relationship. Like unto the neural network (1000), the intermediate outputs are often further processed with an activation function. Many filters may be applied to the input data to form many intermediate representations. Additional filters may be formed to operate on the intermediate representations creating more intermediate representations. This process may be repeated as prescribed by a user. The filters, when convolving with an input, may move in strides such that some elements of the input (e.g., pixels) are skipped. Groupings of the intermediate output representations may be pooled, for example, by considering only the maximum value of a group in subsequent calculations. Strides and pooling may be used to downsample the intermediate representations. Like unto the neural network (1000), additional operations such as normalization, concatenation, dropout, and residual connections may be applied to the intermediate representations. Further, intermediate representations may be upsampled, for example, through techniques such as transpose convolution. In a CNN there is a "final" group of intermediate representations, wherein no more filters act on these intermediate representations. In some instances, the structural relationship of the final intermediate representations is ablated; a process known as "flattening." The flattened representation is usually passed to a neural network (1000), or a least a densely connected layer, to produce the final output. Note, that in this context, the neural network (1000) is still considered part of the CNN. In other instances, the structural relationship of the final layer (i.e., the CNN output) is retained, reorganized, or reshaped for interpretation. Like unto a neural network (1000), a CNN is trained, after initialization of the filter weights, and the edge (1004) values of the internal neural network (1000), if present, with the backpropagation process in accordance with a loss function.

In accordance with one or more embodiments, the machine-learned model (608) used in the parking slot detection methods and systems disclosed herein is a CNN. In particular, in one or more embodiments, the architecture of the CNN is similar to the well-known You Only Look Once (YOLO) object detection model. Various versions of YOLO exist and differ in such things as the types of layers used, resolution of training data, etc. However, a defining trait of all YOLO versions is that multiple objects of varied scales can be detected in a single pass. Further, recent YOLO architectures partition the input image into grid cells and the grid cells each have one or more associated anchor boxes. In one or more embodiments, the machine-learned model (608) follows the same structure of layers as YOLOv4.

While the machine-learned model (608) described herein may be patterned after YOLO, many key distinctions exist. A first distinction is the manner in which the target parking representations of the training data are matched with anchor boxes. To match target parking representations with anchor boxes a training data set must be provided. In accordance with one or more embodiments, a private data set is curated and manually annotated using one or more vehicles (301) each equipped with one or more cameras capable of producing a surrounding view of the vehicle (301) (e.g., see FIG. 3). The private data set may be updated and/or augmented with additional data (e.g., BEV images) as available. In one or more embodiments, the private data set contains annotated BEV images (606) where each BEV image (606) in the private data set spans an area of 25 meters by 25 meters, which is markedly increased from publicly available data sets. Further, the private data set covers a broad range of parking slot configurations. The private data set is used to train, configure, and evaluate the machine-learned model (608). As is common procedure, the private data set is split into a training data set and a test data set. In one or more embodiments, the private data set is split into a training data set, a validation data set, and a test data set.

The training and test data sets consist of many input-target pairs, where an input is a BEV image (606) (e.g., example BEV image (500)) and the associated target is a data structure formatted like the parking slot prediction data (610) but with the ground truth values, or the exact (manually determined or semi-automatically determined) location of each parking representation of a parking slot (102) in the BEV image (606). To properly format the target data structure for each BEV image (606), each ground truth parking representation in a given BEV image (606) must be matched with at least one anchor box.

Figure 11:
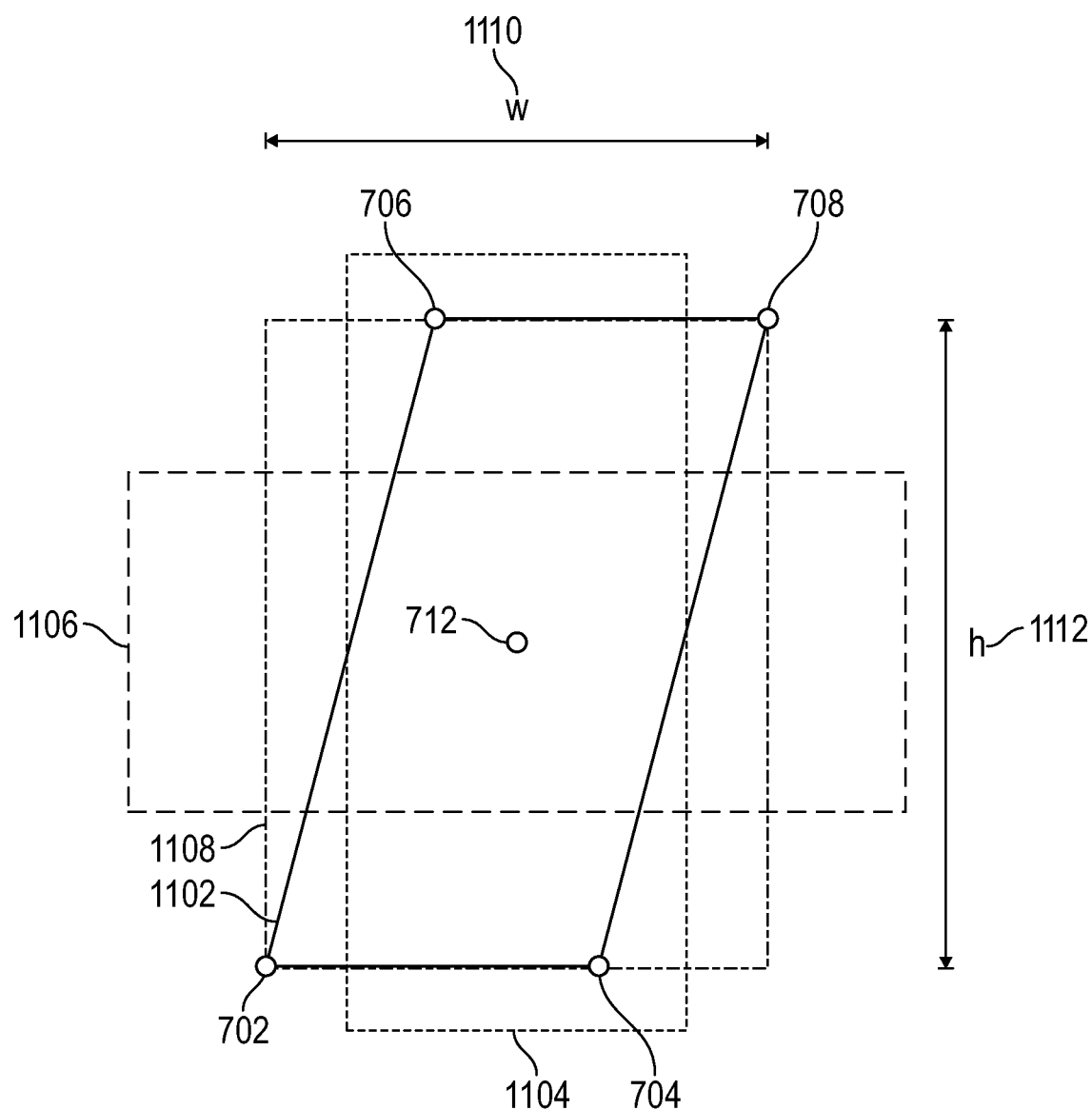
FIG. 11 depicts a ground truth parking representation and two anchor boxes in accordance with one or more embodiments.

FIG. 11 depicts a ground truth parking representation (1102) from an annotated BEV image (606), where, in this example, the ground truth parking representation (1102) is defined using four corners. The center coordinate (712) and corner displacements (804) of the ground truth parking representation (1102) are known. Thus, the exact location of the entrance-left corner (702), entrance-right corner (704), end-left corner (706), and end-right corner (708) are known (or can be determined). Given the center coordinate (712), the ground truth parking representation (1102) is associated with a grid cell (not shown). Each grid cell is associated with K anchor boxes, where K is an integer greater than or equal to one. FIG. 11 depicts two anchor boxes, namely, a first anchor box (1104) and a second anchor box (1106). It is noted that while the ground truth parking representation (1102) is a non-rectangular polygon, the anchor boxes are rectangles, in accordance with one or more embodiments. To match the ground truth parking representation (1102) with an anchor box, first, the enveloping width (1110) and the enveloping height (1112) of the ground truth parking representation (1102) are calculated. The enveloping width (1110) and the enveloping height (1112) are the width and height, respectively, of the smallest rectangular box (1108) that completely encompasses the ground truth parking representation (1102). The enveloping width (1110), w, is calculated as $$w = \max(x_n, \forall_n \{1, \ldots, N\}) - \min(x_n, \forall_n \{1, \ldots, N\})$$

where $x_n$ is the absolute coordinate along the x-axis for the $n^{th}$ corner. For example, in the case of a parking representation with four corners, $x_1$ is the absolute coordinate along the x-axis for the entrance-left corner (702), $x_2$ is the absolute coordinate along the x-axis for the entrance-right corner (704), $x_3$ is the absolute coordinate along the x-axis for the end-left corner (706), and $x_4$ is the absolute coordinate along the x-axis for the end-right corner (708). Likewise, the enveloping height (1112), h, is calculated as $$h = \max(y_n, \forall_n \{1, \ldots, N\}) - \min(y_n, \forall_n \{1, \ldots, N\}),$$

where references to y indicate the absolute coordinate along the y-axis for the corners indexed 1 through N. It is noted that while the term absolute coordinate is used, this term is meant to distinguish between the center-relative coordinate system. In practice, the absolute coordinates may be normalized relative to the width and height of the BEV image (606) or the width or height of the grid cell. Further, the origin of the x and y axes may be placed with respect to the BEV image (606) or the grid cell.

Each anchor box, because it is rectangular, has a width and a height. To determine which anchor box should be associated with the ground truth parking representation, the width and the height of each anchor box is compared to the enveloping width (1110) and the enveloping height (1112) of the ground truth parking representation. Specifically, an anchor box compatibility score is computed for each of the K anchor boxes as follows $$\text{score}_k = \max\left(r, \frac{1}{r}\right), \text{ where } r = \max\left(\frac{w}{w_k}, \frac{h}{h_k}\right),$$

where k serves as an index to reference each of the K anchor boxes (i.e., $1 \leq k \leq K$) and $w_k$ and $h_k$ represent the width and height of the kth anchor box, respectively. In accordance with one or more embodiments, anchor boxes with an anchor box compatibility score greater than a compatibility threshold are immediately removed from consideration. If a single anchor box meets the criteria set by the compatibility threshold, then this anchor box is associated with the ground truth parking representation (1102). In the event that more than one anchor box has a compatibility score less than the compatibility threshold, each of these anchor boxes are associated with the ground truth parking representation (1102). In one or more embodiments, the compatibility threshold is set to 2.

A second distinction of the parking slot detection system of the instant disclosure is that, during training, the parameters of the machine-learned model (608) are updated using a custom loss function. The custom loss function, L, is of the form $$L = \omega_{CIoU}(1 - L_{CIoU}) + \omega_{CD}L_{CD} + \omega_{SC}L_{SC} + \omega_{CV}L_{CV} + \omega_{SM}L_{SM},$$

where $L_{CIoU}$, $L_{CD}$, $L_{SC}$, $L_{CV}$, and $L_{SM}$ may all be considered individual loss functions each corresponding to a portion of the parking slot prediction data (610) and $\omega_{CIoU}$, $\omega_{CD}$, $\omega_{SC}$, $\omega_{CV}$, and $\omega_{SM}$ are weighting terms. In general, the weighting terms may be configured to imbue their associated loss terms with greater or lesser importance and/or to scale the loss terms such that the loss terms are on the same order of magnitude. In one or more embodiments, one or more weighting terms may be set to zero. That is, an individual loss function may be removed from the custom loss function without departing from the scope of this disclosure.

The loss terms $L_{CIoU}$ and $L_{CD}$ are used to evaluate the accuracy of a predicted parking representation, in the parking slot prediction data (610), to a ground truth parking representation (1102) as represented in the target data structure. $L_{CIoU}$ is referred to herein as the aggregate corner intersection over union loss. The aggregate corner intersection over union loss is defined as $$L_{CIoU} = \frac{1}{N}\sum_{i=1}^{N} C_i,$$

where $C_i$ represents a corner intersection over union value. As seen, the aggregate corner intersection over union loss is determined using all N corners of a parking representation. Specifically, $C_i$ is determined using an intersection over union (IoU)-based function applied to the $i^{th}$ corner of the ground truth and predicted parking representations. The IoU-based function may be the original IoU function or any other IoU variant, such as the generalized intersection over union (GIoU) function or distance intersection over union function (DIoU), without departing from the scope of this disclosure.

To better understand the aggregate corner intersection over union loss and how an IoU-based function is applied to each corner of a parking representation, an example is provided herein using the generalized intersection over union (GIoU) function as the IoU-based function when determining the corner intersection over union values ($C_i$). For this example it is useful to know the generalized intersection over union (GIoU) function. The GIoU is a metric that evaluates the closeness, in terms of both shape and location, of two convex shapes. In general, for any two arbitrary convex shapes given as A and B the intersection over union (IoU) of those two shapes is $$IoU = \frac{|A \cap B|}{|A \cup B|}.$$

Further, the smallest convex shape that encloses both A and B is given as C. Then, the generalized intersection over union (GIoU) for the two shapes A and B is determined according to $$GIoU = IoU - \frac{|C \setminus A \cup B|}{|C|}.$$

Figure 12:
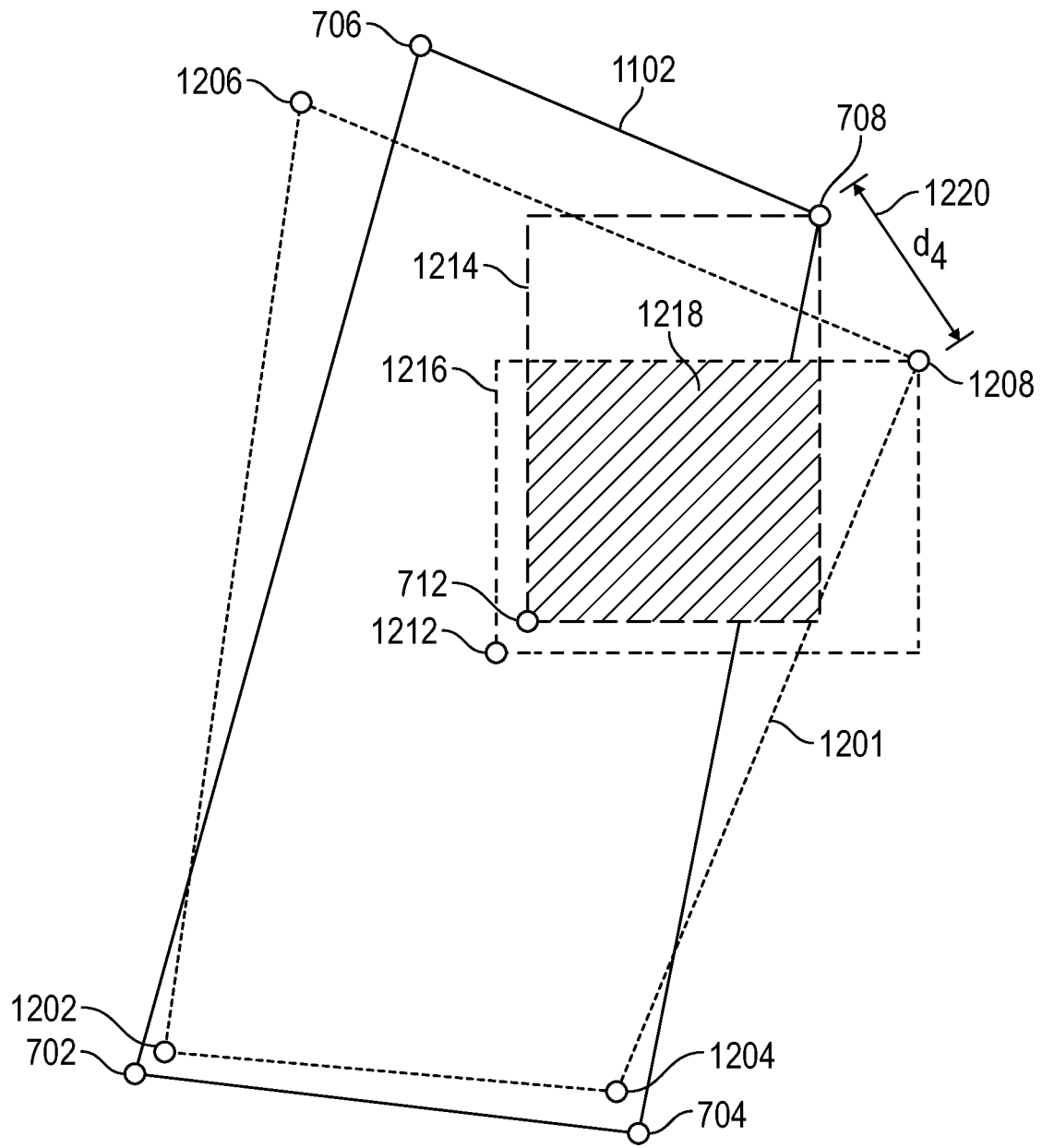
FIG. 12 depicts a ground truth parking representation and a predicted parking representation in accordance with one or more embodiments.

When using the GIoU function in the aggregate corner intersection over union loss, for a comparison of a single ground truth parking representation (1102) to its predicted parking representation, the aggregate corner intersection over union loss is calculated as $$L_{CIoU} = \frac{1}{N}\sum_{i=1}^{N} GIoU_i,$$

where $GIoU_i$ is the generalized intersection over union of two rectangles associated with the $i^{th}$ corner of the ground truth and predicted parking representations. The generalized intersection over union for the $i^{th}$ corner, $GIoU_i$, is best understood with an illustration. FIG. 12 depicts a ground truth parking representation (1102) and an associated predicted parking representation (1201), where the parking representations are defined using four corners. The ground truth parking representation (1102) and the predicted parking representation (1201) are each defined by their respective center coordinates, center coordinate (712) and predicted center coordinate (1212), respectively, and their corner displacements. Specifically, in the example of FIG. 12 which uses four corners, the ground truth parking representation (1102) is defined by the entrance-left corner (702), the entrance-right corner (704), the end-left corner (706), and the end-right corner (708). Likewise, the predicted parking representation (1201) is defined by the predicted entrance-left corner (1202), the predicted entrance-right corner (1204), the predicted end-left corner (1206), and the predicted end-right corner (1208). As seen in FIG. 12, the predicted parking representation (1201) is not accurately aligned with the ground truth parking representation (1102). The purpose of the aggregate corner intersection over union loss is to quantify the alignment between the ground truth parking representation (1102) and the predicted parking representation (1201). This is done, as seen in the above equation, by averaging an IoU-based value for each corner of the ground truth and predicted parking representations. Using the end-right corner (i.e., i=4) as an example, FIG. 12 depicts a first rectangle (1214) which has diagonally opposite corners placed at the center coordinate (712) and the end-right corner (708) of the ground truth parking representation (1102) and a second rectangle (1216) which has diagonally opposite corners placed at the predicted center coordinate (1212) and the predicted end-right corner (1208) of the predicted parking representation (1201). The intersection of the first rectangle (1214) and the second rectangle (1216) is shown as the shaded area (1218) in FIG. 12. The first rectangle (1214) and the second rectangle (1216) can be considered two convex shapes and an IoU-based value (i.e., GIoU) between the first rectangle (1214) and the second rectangle (1216) can be computed. In the present example, the IoU-based function is the generalized intersection over union (GIoU) function. Therefore, in the example of FIG. 12, the generalized intersection of union between the first rectangle (1214) and the second rectangle (1216) is known as the generalized intersection of union for the end-right corner (corner i=4). In general, two rectangles can be formed in a similar manner for each of the four corners of the parking representation in FIG. 12. Thus, continuing with this example, a generalized intersection over union for each corner can be determined using the rectangles formed from the center coordinate to the associated corner for both the ground truth parking representation (1102) and the predicted parking representation (1201).

For a given pair of a ground truth parking representation (1102) and an associated predicted parking representation (1201), the aggregate corner intersection of union loss, $L_{CIoU}$, can be computed by averaging the corner intersection over union values, Cl, over the corners defining the parking representations. It is emphasized that FIG. 12 only illustrates the computation of the generalized intersection over union for the $4^{th}$ corner, however, the same processes may be applied to the remaining corners in order to compute the aggregate corner intersection over union loss for parking representation displayed in FIG. 12. Further, it is emphasized that while the preceding examples used the generalized intersection over union (GIoU) function, aggregate corner intersection over union loss can use any IoU-based function (e.g., IoU, DIoU, GIoU, etc.) without departing from the scope of this disclosure.

$L_{CD}$ is referred to herein as the corner distance loss. Again, using FIG. 12 as an example, the corner distance for the $4^{th}$ corner, $d_4$ (1220), is depicted. In general, the $i^{th}$ corner distance, $d_i$, indicates the Euclidean distance between the $i^{th}$ corner of the ground truth parking representation (1102) and the $i^{th}$ corner of the predicted parking representation (1201). Mathematically, the $i^{th}$ corner distance, $d_i$, is determined as $$d_i = \sqrt{(x_i^{gt} - x_i^{pred})^2 + (y_i^{gt} - y_i^{pred})^2},$$

where $x_i$ and $y_i$ indicate the absolute coordinate of the $i^{th}$ corner along the x and y axes, respectively, and superscript references either the ground truth parking representation (1102) (gt) or the predicted parking representation (1201) (pred). The corner distance loss, $L_{CD}$, is calculated as $$L_{CD} = \frac{1}{N} \sum_{i=1}^{N} d_i.$$

In one or more embodiments the corner distance loss further includes clamping, thresholding, and scaling operations. Given a corner distance threshold, $Thr_{CD}$, in one or more embodiments, the corner distance loss is defined as $$L_{CD} = \frac{1}{N} \sum_{i=1}^{N} \frac{\max(10^{-16}, \min(d_i, Thr_{CD}))}{Thr_{CD}}.$$

$L_{SC}$ is the slot confidence loss. The slot confidence loss operates on the slot confidence (810) output by the machine-learned model (608). The slot confidence (810) is a value between 0 and 1 that represents the confidence that a predicted parking representation (1201) denotes a ground truth parking representation (1102). The slot confidence (810) is analogous to an objectness score in a standard object detection network. In one or more embodiments, the slot confidence loss is a standard binary cross-entropy loss applied to the slot confidence (810) of a predicted parking representation (1201) with the knowledge of whether or not a ground truth parking representation (1102) is associated with said predicted parking representation (1201). In one or more embodiments, the slot confidence loss is a binary cross-entropy loss with logits loss function.

$L_{CV}$ is the corner visibility loss. A corner of a parking representation, or a parking slot (102), may be defined as either visible or occluded. Within the parking slot prediction data (610), the corner visibilities (806) indicate the predicted state, visible or occluded, for each corner of a detected parking slot (102). In practice, the corner visibility is a continuous variable between 0 and 1 indicating the likelihood that a given corner is visible. As such, a binary cross-entropy loss may be applied to each corner of a predicted parking representation (1102) and associated ground truth parking representation (1201), if one exists, and the corner visibility loss, $L_{CV}$, is the average of the binary cross-entropy losses for each corner.

Finally, $L_{SM}$ is the surface material loss. The surface material loss operates on the predicted slot surface material (814) and the known parking slot (102) surface material. In one or more embodiments, the surface material loss uses the categorical cross-entropy loss function.

In accordance with one or more embodiments, the parking slot prediction data (610) only contains the center coordinate (712), corner displacements (804), and slot confidence (810) for each detected parking slot (102). In this case, the custom loss function is defined as $$L = \omega_{CI10}(1 - L_{CI10}) + \omega_{CD} L_{CD} + \omega_{SC} L_{SC}.$$

It is likely that the parking slot detection data (610) predicts many parking slots (102) with low slot confidence (810) values. In accordance with one or more embodiments, parking slots (102) with low slot confidence (810) values may be removed from consideration according to a user-supplied confidence threshold. For example, in one or more embodiments, only the parking slots (102) defined by the parking slot prediction data (610) with a slot confidence (810) value greater than 0.6 are retained and/or considered detected parking slots (102). In other embodiments, post-processing techniques such as non-maximum suppression (NMS) may be applied to remove, or filter out, low-confidence predicted parking representations and to consolidate overlapping predicted parking representations.

Figure 13:
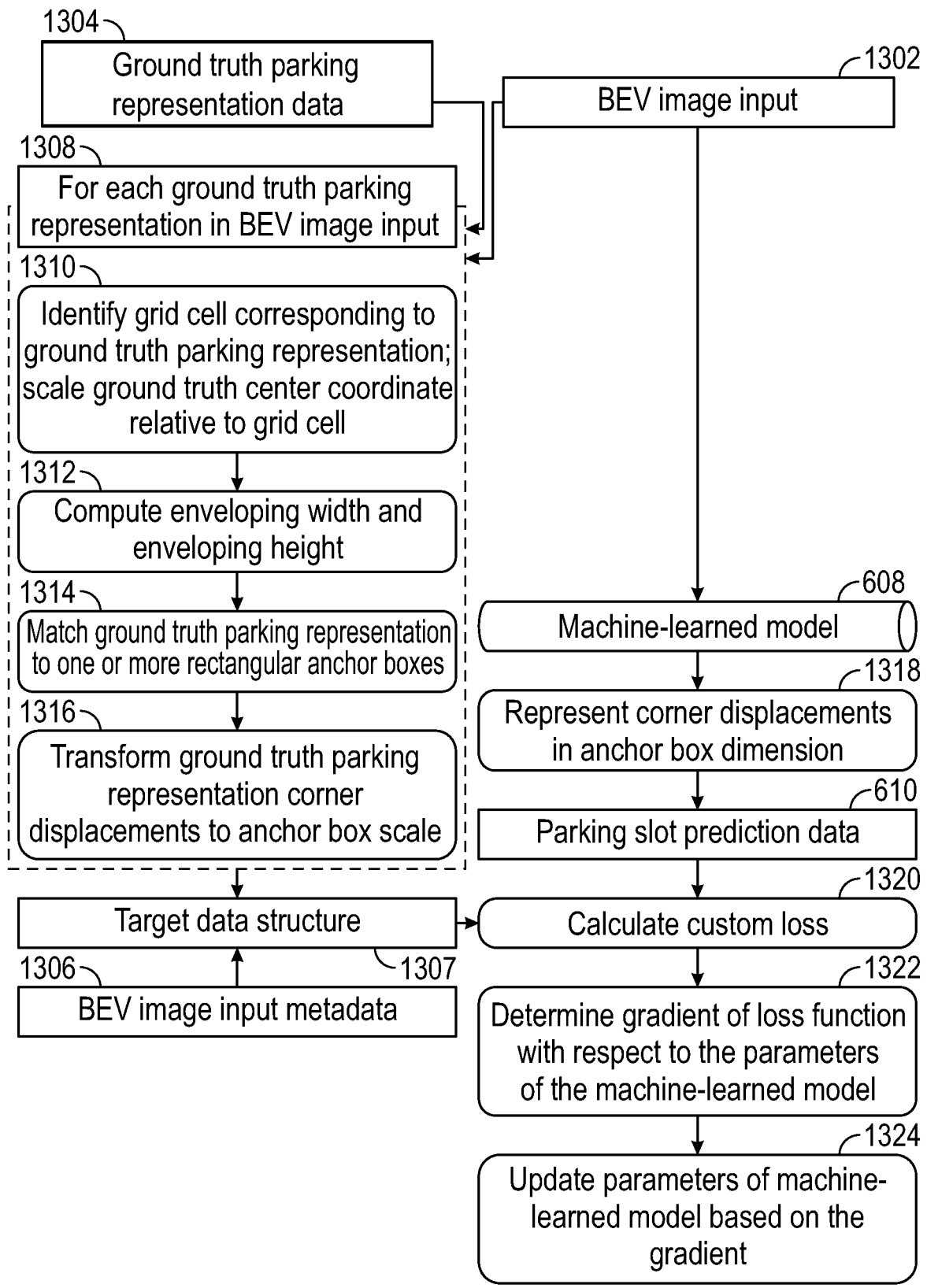
FIG. 13 depicts a flowchart in accordance with one or more embodiments.

FIG. 13 depicts a training step of the machine-learned model (608) in accordance with one or more embodiments. For training, it is assumed that a training data set comprising one or more BEV images (606) and associated target, or ground truth, data (annotations) is provided. To implement a training step, at least one BEV image input (1302) must be provided. The BEV image input (1302), for training, is associated with ground truth parking representation data (1304) and BEV image input metadata (1306). The ground truth parking representation data (1304) describes the ground truth parking representations of available parking slots (102) in the BEV image input (1302). The BEV image input metadata (1306) includes all the additional information about the parking slots in the BEV image input (1302). For example, the BEV image input metadata (1306) indicates the surface material and corner visibility of the parking slots (102) in the BEV image input (1302).

A target data structure (1307) must be created for the BEV image input (1302). To create the target data structure (1307), information regarding each ground truth parking representation in the BEV image input (1308) is encoded in the target data structure (1307). This is done by referencing the ground truth parking representation data (1304) for each (1308) ground truth parking representation in the BEV image input (1302) according to the following steps. First, the grid cell associated with the ground truth parking representation is identified as depicted in Block 1310. Then, the ground truth parking representation center coordinate is scaled relative to the grid cell. Next, in Block 1312, the enveloping width and the enveloping height of the ground truth parking representation are computed. Next, in Block 1314, the ground truth parking representation is matched to at least one rectangular anchor boxes according to the methods previously described herein. Finally, for each ground truth parking representation, the corner displacements are transformed to match the scale of the associated anchor box(es), as shown in Block 1316. Once these steps have been applied to each ground truth parking representation in the BEV image input (1302), the scaled center coordinate and corner displacements for each ground truth parking representation can be appended with the associated BEV image input metadata (1306) and injected into the proper location in the target data structure (1307) according to the identified grid cell and associated anchor box.

Additionally, the BEV image input (1302) is processed by the machine-learned model (608) to produce parking slot prediction data (610). In Block 1318, the corner displacements in the parking slot prediction data (610) are represented, scaled or transformed, according to the dimensions of their predicted associated anchor box(es). In Block 1320, the parking slot prediction data (610) is compared to the target data structure (1307) using the custom loss, L. As shown in Block 1322, the gradient of the custom loss is determined with respect to the parameters of the machine-learned model (608). Next, in Block 1324, guided by the gradient, the parameters of the machine-learned model are updated.

It is noted that while FIG. 13 depicts the parameters of the machine-learned model being updated upon evaluation of a single BEV image input (1302), in general, the update may occur upon processing any number of BEV image inputs (1302). That is, one with ordinary skill in the art will recognize that the training process may be applied to batches of inputs without placing a limitation on the instant disclosure. Further, the processes of generating the target data structure (1307) and producing the parking slot prediction data (610) need not occur simultaneously or in parallel. In one or more embodiments, the target data structure (1307) for each BEV image input (1302) in the training data set is determined and stored before training the machine-learned model (608). Additionally, in accordance with one or more embodiments, the training data set may be augmented using any data augmentation technique known in the art. For example, the training data set may be augmented by randomly applying one or more of the following techniques to each BEV image (606) in the training data set: vertical flip; horizontal flip; random rotation, hue-saturation-value (HSV) color-space adjustment.

It is emphasized that while previous examples referenced a CNN (e.g., YOLO architecture), the methods and techniques (e.g., custom loss, anchor box determination, etc.) disclosed herein are not limited to this choice of machine-learned model. In one or more embodiments, the machine-learned model (608) is a vision transformer (ViT) trained using, at least, the custom loss described above.

In accordance with one or more embodiments, to improve the speed and efficiency of the parking slot detection methods and systems disclosed herein such that parking slots (102) can be detected in real-time using computing systems on-board the vehicle (301), the machine-learned model (608) is implemented in a compiled computer language. In one or more embodiments, the machine-learned model is implemented in C++.

In one or more embodiments, the predicted parking representations (1201), as determined using the parking slot prediction data (610), are post-processed using a Canny filter rectification method. The Canny filter rectification method slightly moves the corners of the predicted parking representations (1201) to the closest points output by a Canny filter. As previously stated, the vehicle (301) may be outfitted with additional sensory systems such as an ultrasonic system and a LiDAR system. In one or more embodiments, sensory data received from the additional sensory system(s) is used to refine the predicted parking representations (1201).

Figure 14:
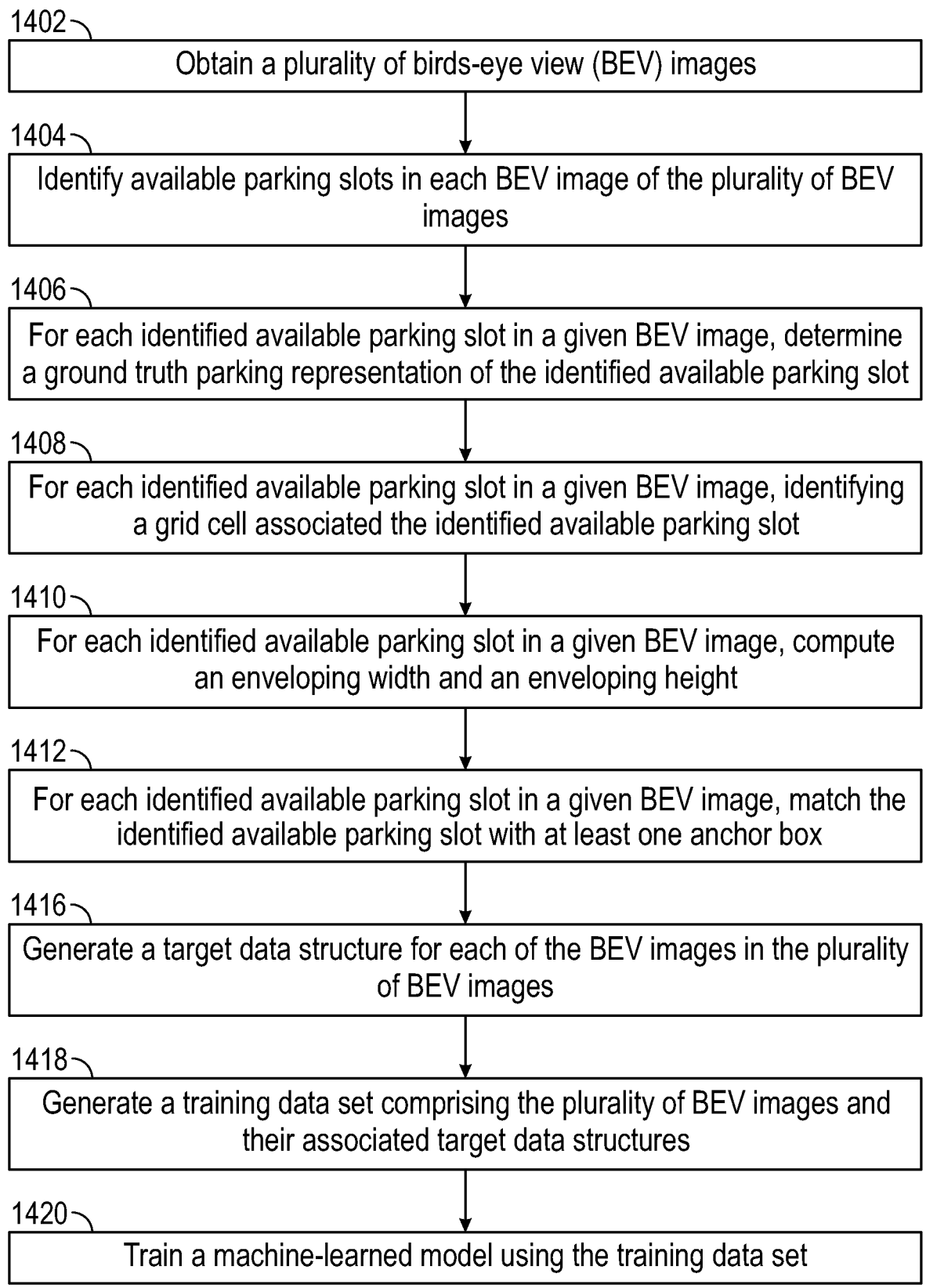
FIG. 14 depicts a flowchart in accordance with one or more embodiments.

FIG. 14 depicts a flowchart outlining the general process for training the machine-learned model (608), in accordance with one or more embodiments. In Block 1402, a plurality of birds-eye view (BEV) images are collected. Each BEV image is constructed from one or more images acquired with one or more cameras disposed on a vehicle (301). The plurality of BEV images contain a wide variety of parking slot (102) configurations (e.g., parking slot orientation, parking slot surface material, marking linestyle, etc.) under a variety of environmental conditions (e.g., nighttime, daytime, rainy, etc.) and settings (i.e., indoor, outdoor). In Block 1404, available parking slots (102) are identified in each of the BEV images in the plurality of BEV images. In general, a BEV image may contain zero or more available parking slots (102). In one or more embodiments, the available parking slots (102) are identified manually or by using a semi-automated iterative process. In Block 1406, each of the identified available parking slots are represented using a ground truth parking representation. Each ground truth parking representation is denoted by a center coordinate for the identified available parking slot (102) and two or more center-relative coordinate pairs corresponding to the corners of the ground truth parking representation, where the ground truth parking representation is defined with two or more corners. In Block 1408, for each of the identified available parking slots (102) in a given BEV image, a grid cell of the BEV image associated with the identified parking slot (its ground truth parking representation) is identified. In Block 1410, for each identified available parking slot (102), an enveloping width and an enveloping height are computed. The enveloping width and the enveloping height correspond to the width and height, respectively, of the smallest rectangle that encloses the ground truth parking representation for the identified available parking slot (102). In Block 1412, for each identified parking slot (102) in a given BEV image, its ground truth parking representation is matched with one or more anchor boxes. That is, each identified available parking slot (102) in a given BEV image is matched with at least one anchor box. Considering a single given ground truth parking representation, the matching is done by comparing the enveloping width and enveloping height of the ground truth parking representation to the width and height of candidate anchor boxes. Note that in one or more embodiments, candidate anchor boxes are the anchor boxes associated with the grid cell of the given ground truth parking representation. However, in other embodiments, any anchor box may be considered a candidate anchor box regardless of any grid cell association of either the given ground truth parking representation or the anchor box. In Block 1416, a target data structure (1307) is generated for each of the BEV images in the plurality of BEV images. Each target data structure (1307) contains, at least, the center coordinate and center-relative coordinate pairs (i.e., corner displacements) for each of the identified available parking slots (102) in the associated BEV image. In other words, each target data structure (1307) contains the ground truth parking representation for each of the identified available parking slots (102) in the associated BEV image. The target data structure (1307) is structured with respect to the grid cells and anchor boxes of the BEV image. In Block 1418, a training data set is generated. The training data set includes the plurality of BEV images and their associated target data structures (1307). Finally, in Block 1420, the machine-learned model (608) is trained using, at least, the training data set. In one or more embodiments, a portion of the training data set may be reserved (not used in training) as a validation data set and/or a test data set. The machine-learned model (608) is trained with a backpropagation process, where the parameters of the machine-learned model (608) are updated with guidance from the custom loss function. The resulting trained machine-learned model (608) can directly receive a BEV image and output parking slot prediction data (610). The parking slot prediction data (610) contains, at least, predicted center coordinates and corner displacements for predicted parking slots (102). In one or more embodiments, the parking slot prediction data (610) is post-processed with scaling and a Canny filter method to further refine and localize predicted parking slots (102). Because the plurality of BEV images contain parking slots (102) of many configurations, the trained machine-learned model is robust and can accurately detect parking slots (102) regardless of their orientation, surface material, and other factors.

Figure 15:
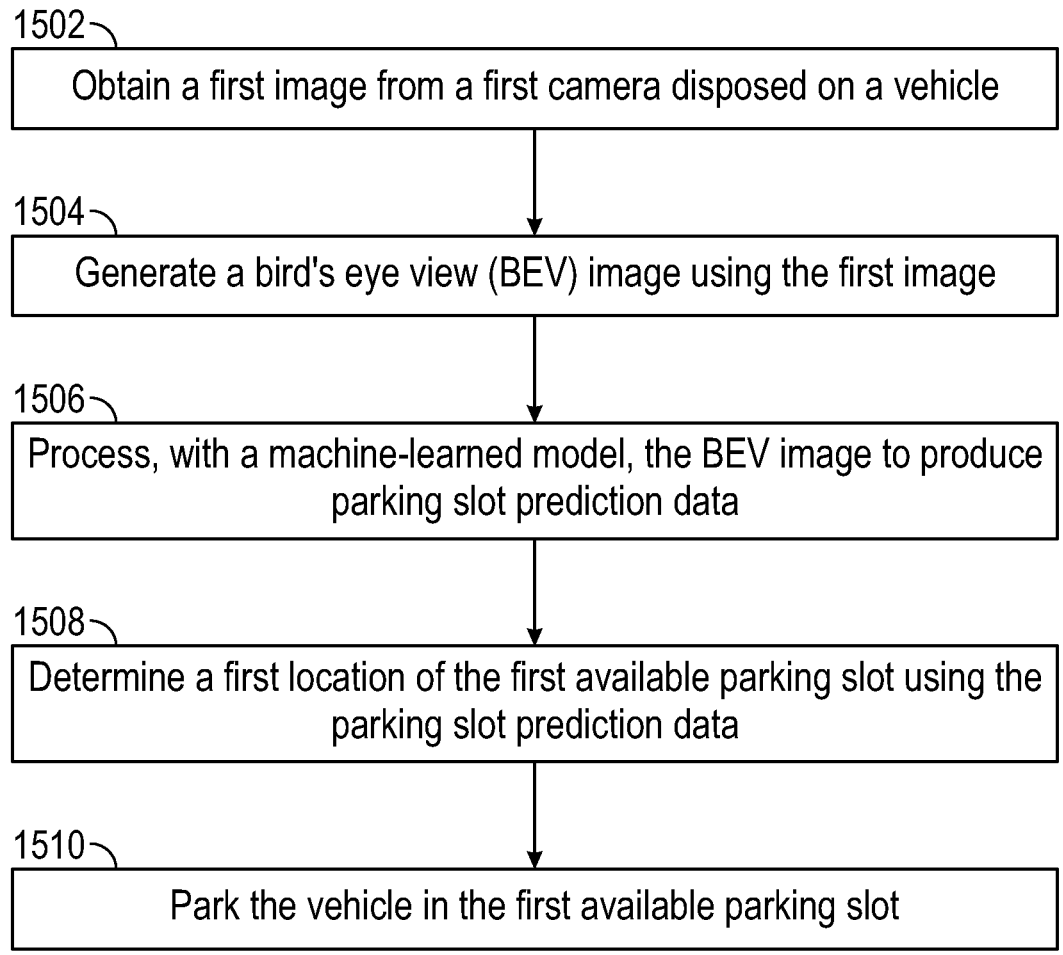
FIG. 15 depicts a flowchart in accordance with one or more embodiments.

FIG. 15 depicts a flowchart outlining the usage of a trained machine-learned model (608) in accordance with one or more embodiments. In Block 1502, a first image is received from a first camera disposed on a vehicle (301). In Block 1504, a BEV image is generated from the first image. In one or more embodiments, the BEV image is generated from the first image using an inverse perspective mapping (IPM) method. In Block 1506, the BEV image is processed with the machine-learned model (608). Again, for the purposes of FIG. 15, it is assumed that the machine-learned model (608) has been previously trained, for example, according to the flowchart of FIG. 14. Thus, the machine-learned model (608), upon processing the BEV image, is configured to produce, or output, parking slot prediction data (610). The parking slot prediction data includes a first center coordinate for a first available parking slot where the first available parking spot is visible within the BEV image and a first corner displacement data. The first corner displacement data includes a relative coordinate pair for each corner of the parking representation of the first available parking slot. That is, the first corner displacement data includes, at least: a first relative coordinate pair that locates a first corner relative to the first center coordinate and a second relative coordinate pair that locates a second corner relative to the first center coordinate. In one or more embodiments, the parking representation may be defined using four corners such that the first corner displacement data further includes a third relative coordinate pair that locates a third corner relative to the first center coordinate and a fourth relative coordinate pair that locates a fourth corner relative to the first center coordinate. The coordinate pairs each carry a mutually exclusive corner designation. For example, in one or more embodiments, the first corner is the entrance-left corner (702). In one or more embodiments, the corner designations are provided using an index. For example, corners may be designated as corner 1, corner 2, and so on and so forth until the final corner (recall, number of corners may be two or more). The first center coordinate and the first corner displacement data are sufficient to fully define a first parking representation (i.e., predicted parking representation) that represents a prediction for the location of the first available parking slot. The parking slot prediction data (610) further includes a first parking slot confidence indicating the confidence of the machine-learned model (610) that the first parking representation accurately aligns with an available parking slot. Continuing, in Block 1508, a first location of the first available parking slot is determined using the parking slot prediction data (610). Specifically, the first location is determined using the first parking representation, which represents the predicted location (i.e., first location) of the first available parking slot. In one or more embodiments, the first location indicates the location of the first available parking slot in the physical space of the vehicle (301). Determining the first location may require a scaling of the first parking representation, however, one with ordinary skill in the art will recognize that coordinate transformations to and from model space and physical space do not exceed the scope of this disclosure. With a predicted first location in-hand, in Block 1510, the vehicle (301) may be parked in the first available parking slot. In one or more embodiments, the vehicle (301) is parked in the first available parking slot when the first parking slot confidence meets or exceeds a pre-determined threshold. For example, in one or more embodiments, the threshold is set to 0.5. In one or more embodiments, the vehicle (301) is parked in the first available parking slot without the assistance of a driver. That is, the vehicle (301) is parked automatically. In one or more embodiments, the first available parking slot (102) is proposed to a user of the vehicle (e.g., a driver) and the user can confirm or reject the parking slot. Finally, it is noted that when parking the vehicle (301), due to the detection of the first available parking slot and satisfaction of the threshold, BEV images may be continually generated using one or more images acquired with one or more cameras disposed on the vehicle (301). The BEV images acquired during parking may be processed by the machine-learned model (608) to continually update (in real time) the first center coordinate and the first corner displacement data (i.e., the predicted parking representation and first location) relative to the vehicle (301) and to aid the parking process (e.g., determining and monitoring a proposed trajectory of the vehicle).

Embodiments of the parking detection methods and systems disclosed herein possess, at least, the following advantages. Embodiments disclosed herein identify an available parking slot (102) with a parking representation that envelops the area of the parking slot (102). The parking representation is defined using two or more corners. Thus, the representation of a parking slot (102) is not limited to a rectangular form. Further, by representing an available parking slot (102) with a parking representation, embodiments disclosed herein can detect the available parking slot (102) regardless of the relative viewpoint of the vehicle, without rotation or affine operations. Further, embodiments disclosed herein specify a corner designation for each corner of the parking representation of the parking slot (102). Consequently, one or more entry lines can be readily determined for the available parking slot (102) directly from the parking representation without the need for a specialized, and separate, entry line detector. Additionally, embodiments disclosed herein output parking slot prediction data (610) directly from the machine-learned model (608) without the need for multiple neural network heads. That is, the machine-learned model (608) need not be partitioned into separate prediction tasks. Moreover, in one or more embodiments, the parking slot prediction data (610) classifies the visibility of each corner of a parking representation and a parking representation can be used to represent a parking slot (102) even when one or more of the parking slot (102) corners are occluded. Another major advantage is that BEV images may be acquired and processed by the machine-learned model (608) throughout a parking procedure to continuously monitor the relative location of the parking slot (102) to the vehicle (301) and ensure successful vehicle parking. That is, in one or more embodiments, parking slot prediction data (610) is used by the on-board driver assistance system of the vehicle (301) while actively parking or "diving" the vehicle into a detected available parking slot (102). Finally, the area enclosed by a parking slot (102) can be easily determined using the parking representation, whether the parking slot (102) is occluded or not.

Figure 16:
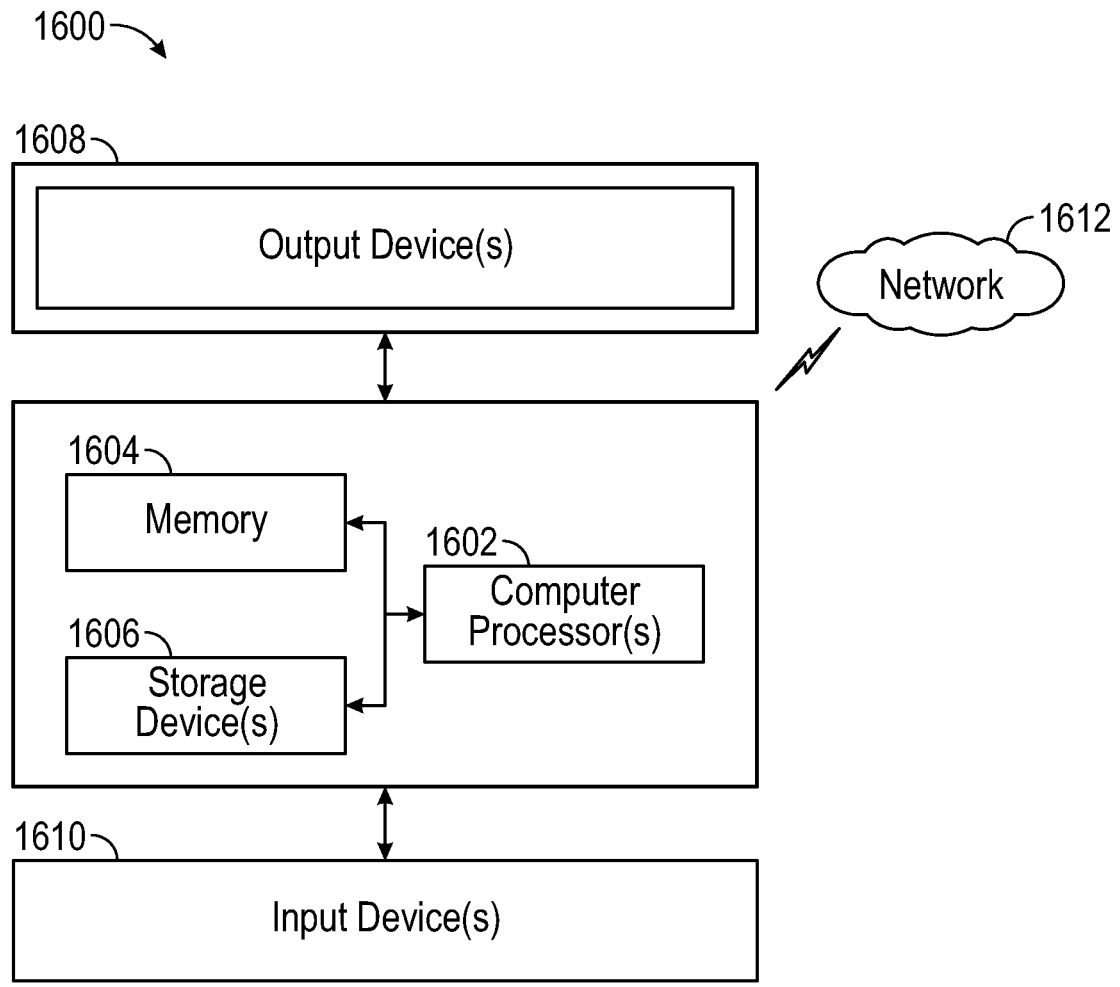
FIG. 16 depicts a system in accordance with one or more embodiments.

Embodiments of the invention may be implemented on virtually any type of computing system, regardless of the platform being used. For example, the parking slot detection methods and systems discussed in embodiments herein may be implemented as a computing system as shown in FIG. 16 or include one or more computing systems. Such a computing system may be one or more mobile devices (e.g., laptop computer, smart phone, personal digital assistant, tablet computer, or other mobile device), desktop computers, servers, blades in a server chassis, one or more ECUs in a vehicle or any other type of computing device or devices that includes at least the minimum processing power, memory, and input and output device(s) to perform one or more embodiments of the invention. For example, as shown in FIG. 16, the computing system (1600) may include one or more computer processor(s) (1602), associated memory (1604) (e.g., random access memory (RAM), cache memory, flash memory, etc.), one or more storage device(s) (1606) (e.g., a hard disk, an optical drive such as a compact disk (CD) drive or digital versatile disk (DVD) drive, a flash memory stick, etc.), and numerous other elements and functionalities. The computer processor(s) (1602) may be an integrated circuit for processing instructions. For example, the computer processor(s) may be one or more cores, or micro-cores of a processor. The computing system (1600)

may also include one or more input device(s) (1610), such as a touchscreen, keyboard, mouse, microphone, touchpad, electronic pen, or any other type of input device. Further, the computing system (1600) may include one or more output device(s) (1608), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (1600) may be connected to a network (1612) (e.g., a local area network (LAN), a wide area network (WAN) such as the Internet, mobile network, or any other type of network) via a network interface connection (not shown). The input and output device(s) may be locally or remotely (e.g., via the network (1612)) connected to the computer processor(s) (1602), memory (1604), and storage device(s) (1606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (1600) may be located at a remote location and be connected to the other elements over a network (1612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While multiple embodiments describe herein use a convolutional neural network-based machine-learned model, one with ordinary skill in the art will recognize that the parking slot detection methods and systems disclosed herein can be readily used with other types of machine-learned models. Thus, embodiments disclosed herein are not limited to the use of a convolutional neural network-based machine-learned model. Machine-learned models such as a vision transformer (ViT) may be readily inserted into this framework and do not depart from the scope of this disclosure.

Further, while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
obtaining a first image from a first camera disposed on a vehicle;
generating a birds-eye view (BEV) image using the first image;
processing, with a machine-learned model, the BEV image to produce parking slot prediction data, wherein the parking slot prediction data comprises:
a first center coordinate for a first available parking slot;
a first corner displacement data, comprising:
a first relative coordinate pair that locates a first corner relative to the first center coordinate; and
a second relative coordinate pair that locates a second corner relative to the first center coordinate;
a first parking slot confidence;
determining a first location of the first available parking slot using the parking slot prediction data; and
parking the vehicle in the first available parking slot when the first parking slot confidence meets a threshold.

2. The method of claim 1, wherein the parking slot prediction data further comprises:
a second center coordinate for a second available parking slot;
a second corner displacement data, comprising:
a third relative coordinate pair that locates a third corner relative to the second center coordinate;
a fourth relative coordinate pair that locates a fourth corner relative to the second center coordinate; and
the method further comprising determining a second location of the second available parking slot using the parking slot prediction data.

3. The method of claim 1, further comprising:
obtaining a second image from a second camera disposed on the vehicle;
wherein the BEV image is generated using the first image and the second image.

4. The method of claim 1, wherein the BEV image is generated through inverse perspective mapping.

5. The method of claim 1, wherein while parking the vehicle, the first center coordinate and first corner displacement data are continuously updated based on the machine-learned model processing newly generated BEV images.

6. The method of claim 1, further comprising:
representing the first available parking slot with a first parking representation, wherein the first parking representation is fully specified by the first center coordinate and the first corner displacement data;
determining one or more entry lines for the first available parking slot; and
determining an area enclosed by the first parking representation.

7. The method of claim 1, wherein the parking slot prediction data further comprises:
a first corner visibility data, wherein the first corner visibility data indicates whether each corner in the first corner displacement data is visible or occluded; and
a first slot surface material, wherein the first slot surface material specifies a material class for the first available parking slot.

8. The method of claim 1, further comprising:
determining a slot orientation for the first available parking slot, wherein the slot orientation is one of: perpendicular, parallel, and fishbone.

9. A system, comprising:
a vehicle;
a first camera disposed on the vehicle;
a birds-eye view (BEV) image;
a machine-learned model; and
a computer, comprising one or more computer processors, the computer configured to:
obtain a first image from the first camera;

construct the BEV image from the first image;
process, with the machine-learned model, the BEV image to produce parking slot prediction data, wherein the parking slot prediction data comprises:
  a first center coordinate for a first available parking slot;
  a first corner displacement data, comprising:
    a first relative coordinate pair that locates a first corner relative to the first center coordinate; and
    a second relative coordinate pair that locates a second corner relative to the first center coordinate; and
  a first parking slot confidence;
determine a first location of the first available parking slot using the parking slot prediction data; and
park the vehicle in the first available parking slot without the assistance of a driver when the first parking slot confidence meets a threshold.

10. The system of claim 9, wherein the parking slot prediction data further comprises:
a second center coordinate for a second available parking slot;
a second corner displacement data, comprising:
  a third relative coordinate pair that locates a third corner relative to the second center coordinate;
  a fourth relative coordinate pair that locates a fourth corner relative to the second center coordinate; and
  a second parking slot confidence;
wherein the computer is further configured to determine a second location of the second available parking slot using the parking slot prediction data.

11. The system of claim 9, further comprising:
a second camera disposed on the vehicle,
wherein the computer is further configured to:
  obtain a second image from the second camera; and
  construct the BEV image using the first image and the second image.

12. The system of claim 9, wherein while parking the vehicle, the first center coordinate and first corner displacement data are continually updated using the machine-learned model processing newly obtained BEV images.

13. The system of claim 9, wherein the parking slot prediction data further comprises:
  a first corner visibility data, wherein the first corner visibility data indicates whether each corner in the first corner displacement data is visible or occluded; and
  a first slot surface material, wherein the first slot surface material specifies a material class for the first available parking slot.

14. The system of claim 9, wherein the computer is further configured to:
  determine a slot orientation for the first available parking slot, wherein the slot orientation is one of: perpendicular, parallel, and fishbone.

* * * * *